US010947157B2

(12) United States Patent
Criniere et al.

(10) Patent No.: US 10,947,157 B2
(45) Date of Patent: Mar. 16, 2021

(54) METHOD FOR MANUFACTURING BRIQUETTES CONTAINING A CALCIUM-MAGNESIUM COMPOUND AND AN IRON-BASED COMPOUND, AND BRIQUETTES THUS OBTAINED

(71) Applicant: S. A. Lhoist Recherche et Developpement, Ottignies-Louvain-la-Neuve (BE)

(72) Inventors: Guillaume Criniere, Braine-l'Alleud (BE); Michael Nispel, Louvain-la-Neuve (BE)

(73) Assignee: S. A. Lhoist Recherche et Developpement, Ottignies-Louvain-la (BE)

( * ) Notice: Subject to any disclaimer, the term of this patent is extended or adjusted under 35 U.S.C. 154(b) by 0 days.

(21) Appl. No.: 16/307,567

(22) PCT Filed: Jul. 7, 2017

(86) PCT No.: PCT/EP2017/067165
§ 371 (c)(1),
(2) Date: Dec. 6, 2018

(87) PCT Pub. No.: WO2018/007629
PCT Pub. Date: Jan. 11, 2018

(65) Prior Publication Data
US 2019/0292626 A1 Sep. 26, 2019

(30) Foreign Application Priority Data
Jul. 8, 2016 (BE) .................................. 2016/5575

(51) Int. Cl.
| | | |
|---|---|---|
| *C04B 18/02* | (2006.01) | |
| *C22B 1/243* | (2006.01) | |
| *C22B 1/245* | (2006.01) | |
| *C04B 14/30* | (2006.01) | |

(Continued)

(52) U.S. Cl.
CPC .......... *C04B 18/021* (2013.01); *C04B 14/308* (2013.01); *C04B 22/064* (2013.01);
(Continued)

(58) Field of Classification Search
CPC ....... C22B 1/243; C22B 1/245; C04B 14/308; C04B 18/021; C04B 22/064; C04B 22/066
See application file for complete search history.

(56) References Cited

U.S. PATENT DOCUMENTS

| | | | |
|---|---|---|---|
| 3,649,248 A | 3/1972 | Ishimitsu et al. | |
| 5,186,742 A | 2/1993 | Hoffman et al. | |
| 2016/0115076 A1* | 4/2016 | Criniere ................... | C01F 5/02 106/457 |

FOREIGN PATENT DOCUMENTS

| | | |
|---|---|---|
| EP | 2199417 B1 | 10/2011 |
| EP | 3042965 A1 | 7/2016 |

(Continued)

OTHER PUBLICATIONS

Saramak, Daniel. "Technological issues of High-Pressure Grinding Rolls Operation in Ore Comminution Processes." Arch. Min. Sci. vol. 56, pp. 517-526 (Year: 2011).*

(Continued)

*Primary Examiner* — Scott R Kastler
(74) *Attorney, Agent, or Firm* — Whitaker Chalk Swindle & Schwartz PLLC; Charles Gunter

(57) ABSTRACT

A method for manufacturing green or thermally treated briquettes which are made up of at least one quick calcium-magnesium compound that is an iron-based compound. The method includes the steps of supplying a homogeneous pulverulent mixture to a roller press, the press having pockets where the pulverulent mixture is compressed to form the green briquettes. The rollers of the roller press develop linear speeds at the periphery of the rollers between (Continued)

10 and 100 cm/s and linear pressures between 60 and 160 kN/cm. The method can also include a thermal treatment of the green briquettes to produce fired briquettes containing calcium ferrite, the briquettes having a Shatter Test Index less than 8%, and a porosity value greater than or equal to 30%.

11 Claims, 5 Drawing Sheets

(51) Int. Cl.
*C04B 22/06* (2006.01)
*C04B 111/00* (2006.01)

(52) U.S. Cl.
CPC ............ *C04B 22/066* (2013.01); *C22B 1/243* (2013.01); *C22B 1/245* (2013.01); *C04B 2111/0087* (2013.01); *C04B 2111/00732* (2013.01); *C04B 2111/00758* (2013.01); *C04B 2111/00887* (2013.01)

(56) References Cited

FOREIGN PATENT DOCUMENTS

| JP | S6135938 A | 2/1986 |
| JP | H11209817 A | 8/1999 |
| JP | 2006297324 A | 11/2006 |
| JP | 2013087350 A | 5/2013 |
| WO | 03012154 A1 | 2/2003 |
| WO | 201507661 A1 | 1/2015 |

OTHER PUBLICATIONS

Ji-Won Jeon et al. "Formation of Calcium Ferrites under Controlled Oxygen Potentials at 1273 K." ISIJ International. vol. 50, No. 8, pp. 1064-1070. (Year: 2010).*

Vol. 24, No. 10., "Taking the Heat Out of Grinding", Article; 4 pages, Oct. 2010, copyight Powder and Bulk Engineering, CSC Publishing, Inc. www.powderbulk.com/wp-content/uploads/pdf/pbe_2010110_058.pdf.

Garcia, E.A.S., et al., "Pelotizacao De Finos De Calcario Utilzando Agua E Cal Virgem Como Agentes Aglomerantes", XXVI Encontro Nacional De Tratamento De Minerios E Metalurgia Extrativa, vol. 1, 2015, 9 pages.

PCT/EP2017/067165 International Search Report, dated Sep. 21, 2017, 4 pages.

Barnett, Thomas P., "Roll-Press Briquetting: Compacting Fines to Reduce Waste Handling Costs", Article, 5 pages, copyright Powder and Bulk Engineering, CSC Publishing, Inc., Oct. 2010.

* cited by examiner

METHOD FOR MANUFACTURING BRIQUETTES CONTAINING A CALCIUM-MAGNESIUM COMPOUND AND AN IRON-BASED COMPOUND, AND BRIQUETTES THUS OBTAINED

The present invention relates to a method for manufacturing a composition in the form of briquettes containing a "quick" calcium-magnesium compound and an iron-based compound, to green briquettes containing the "quick" calcium-magnesium compound and iron oxide, to thermally treated briquettes containing the "quick" calcium-magnesium compound and calcium ferrites, and to the use thereof.

The term "quick" calcium-magnesium compound means, in the sense of the present invention, a solid mineral material whose chemical composition is mainly calcium oxide and/or magnesium oxide. The "quick" calcium-magnesium compounds in the sense of the present invention therefore comprise quicklime (calcium lime), magnesium quicklime, dolomitic quicklime or "quick" calcined dolomite. The "quick" calcium-magnesium compounds contain impurities, namely, compounds such as silica, $SiO_2$ or alumina, $Al_2O_3$, etc., at the level of a few percent. It is to be understood that these impurities are expressed in the aforementioned forms but may in reality appear as different phases. It also generally contains a few percent of residual $CaCO_3$ or $MgCO_3$, called underburned, and a few percent of residual $Ca(OH)_2$ or $Mg(OH)_2$, owing to partial hydration of the "quick" products during the steps of cooling, handling and/or storage.

Quicklime means a solid mineral material, whose chemical composition is mainly calcium oxide, CaO. Quicklime is commonly obtained by calcination of limestone, mainly consisting of $CaCO_3$. Quicklime contains impurities, namely compounds such as magnesium oxide MgO, silica $SiO_2$, or alumina $Al_2O_3$, etc., at a level of a few percent. It is to be understood that these impurities are expressed in the aforementioned forms but may in reality appear as different phases. It also generally contains a few percent of residual $CaCO_3$, called underburned, and a few percent of residual $Ca(OH)_2$, owing to partial hydration of calcium oxide CaO during the phases of cooling, handling and/or storage.

According to the present invention, the term "briquette" means a compact of oblong shape, weighing about 5 to 100 g per briquette, inscribed in a flattened or elongated ellipsoid of revolution ("oblate ellipsoid of revolution" or "prolate ellipsoid of revolution"). Typically, briquettes have the shape of a bar of soap or are described as "egg briquettes".

These contrast with tablets, which are typically in the form of pellets, such as those produced with the "Titan" presses from the company "Eurotab". By definition, tablets for industrial use are of regular shape, more particularly in the form of a cylinder with a small height.

Briquettes are known from the prior art, see for example document WO2015007661. According to this document, compacts (i.e. briquettes or tablets) are described comprising particles of calcium-magnesium compound comprising at least 50% of "quick" calcium-magnesium compound. The compacts (in the form of briquettes or tablets) disclosed may also contain additives, in particular iron oxide.

According to that document, drop strength (drop mechanical strength) is measured in a shatter test. The compacts described generally have a shatter test index below 10%.

The term "shatter test index" means, in the sense of the present invention, the percentage by weight of fines under 10 mm generated after 4 drops from 2 m starting from 10 kg of product. These fines are quantified by sieving through a screen with square mesh of 10 mm after 4 drops from 2 m.

A detailed analysis of the examples and counter-examples of that document shows that green tablets having an improved drop strength were obtained using at least 50% of "quick" products, and that these tablets also display resistance to ageing in humid atmosphere. In contrast, when briquettes of "quick" compounds are obtained using "quick" compounds, the shatter test index, representing the mechanical strength, remains high (between 13 and 15%) and it is necessary to carry out a thermal treatment if it is desired to reach a shatter test index below 10%.

Document U.S. Pat. No. 5,186,742 discloses lime briquettes containing from 55 to 85 wt % of lime, from 10 to 40 wt % of ash and from 0.1 to 10 wt % of paper fibres as well as optionally a lubricant. The briquettes disclosed in document U.S. Pat. No. 5,186,742 were tested for their drop survival rate, a test that is not comparable to the test for measuring the shatter test index, and they have a crush strength between 150 and 300 pounds, which corresponds to a shatter test index well above 10%.

Calcium-magnesium compounds are used in many industries, for example iron and steel metallurgy, treatment of gases, treatment of water and sludge, agriculture, the building industry, public works etc. They may be used either in the form of pebbles or lumps, or in the form of fines (generally smaller than 7 mm). However, the pebble form is preferred in certain industries.

This is the case, for example, in the iron and steel industry, when adding calcium and magnesium compounds to oxygen converters or arc furnaces.

During production of these pebbles and lumps, a large number of fines is generated. These fines typically have limited potential for use as they are difficult to transport and handle.

For some years it has been the aim in a number of sectors to transform compounds initially in the form of powder into briquettes for easier and safer transport, handling and use.

Lime producers always maintain a balance of materials between the calcium-magnesium compounds in pebble form and the fines generated before and during calcination as well as during handling and subsequent operations. Nevertheless, an excess of fines is produced in certain cases. These fines may then be agglomerated together in the form of briquettes or the like, which not only makes it possible to remove the excess fines but also to increase the production of calcium and magnesium compounds in pebble form artificially by adding these briquettes or the like to the pebbles.

The document of Barnett et al. (Roll-press briquetting: Compacting fines to reduce waste-handling costs, Powder and Bulk Engineering, Vol. 24, No. 10, October 2010, 1-6) describes a method for manufacturing green lime briquettes. However, this document is silent regarding the production conditions as well as regarding the mechanical properties of the briquettes obtained. Briquettes based on excess fines or the like generally have lower mechanical strength than the calcium and magnesium compounds in pebble form. Their resistance to ageing during storage or handling is also well below that of the calcium and magnesium compounds in pebble form.

This explains why, in practice, briquetting of fines of calcium and magnesium compounds is not much used at present. Taking into account the low quality of the briquettes formed by this type of process, it is estimated that briquetting provides a yield below 50%, owing to the presence of a very large number of unusable briquettes at the end of this type of process, which requires a recycling step.

Lubricants and binders are additives that are often used in methods of agglomeration in the form of briquettes or similar.

Lubricants may be of two types, internal or external. Internal lubricants are mixed intimately with the materials to be briquetted. They promote on the one hand the flowability of the mixture during feed of the briquetting machine and on the other hand rearrangement of the particles within the mixture during compression. External lubricants are applied on the surfaces of the rollers of the briquetting machine and mainly aid mould release. In both cases they reduce friction on the surface and therefore wear. The lubricants may be liquids such as mineral oils, silicones, etc., or solids such as talc, graphite, paraffins, stearates, etc. In the case of compositions based on "quick" calcium-magnesium compounds, stearates are preferred, and more particularly calcium stearate or magnesium stearate.

Binders are substances having the property of agglomerating the particles together, either by forces of adhesion, or by a chemical reaction. They may be of mineral origin (cements, days, silicates, etc.), of plant or animal origin (celluloses, starches, gums, alginates, pectin, glues, etc.), of synthetic origin (polymers, waxes, etc.). In many cases they are used together with water, which activates their agglomeration properties.

Over the years, several of these additives have been used for increasing the strength and durability of the briquettes or similar of calcium and magnesium compounds (calco-magnesian), for example calcium stearate or paper fibres (see for example U.S. Pat. No. 5,186,742), but without this giving sufficient improvement. Moreover, in a great many cases the use of the additives currently employed for other shaped industrial products is limited, as is the case notably for the manufacture of briquettes of calcium-magnesium compounds, either because the calcium-magnesium compounds react violently with water, or owing to a potentially negative effect of these additives on the end use of the briquettes of calcium-magnesium compounds.

In many refining processes in iron and steel metallurgy, a composition of "quick" calcium-magnesium compounds, such as quicklime and/or "quick" dolomite as well as scrap iron, are added to a converter to control the kinetics and chemistry of the slag forming reaction, thus facilitating removal of impurities and protecting the refractory lining of the furnace against excessive wear.

The "quick" calcium-magnesium compounds introduced float on the bath of hot metal, thus forming an interface.

During refining, molten metal is introduced into the vessel, to which scrap iron may also be added.

The molten metal resulting from the fusion of metal compounds has an initial carbon content typically from 40 to 45 kg per tonne of molten metal and an initial phosphorus content from 0.7 to 1.2 kg per tonne of molten metal.

The "quick" calcium-magnesium compounds are charged and float above the bath of molten metal. Oxygen is blown in for a predetermined period of time, in order to burn off the carbon and oxidize, directly and/or indirectly, the phosphorus-containing compounds, and silicon. During blowing, the calcium-magnesium compounds are immersed in the bath of molten metal and dissolve/melt slightly at the interface with the molten metal, the calcium-magnesium compounds always floating.

Slag is the layer of oxides floating on top of the bath and results from the formation of $SiO_2$ due to oxidation of the silicon, from formation of other oxides (MnO and FeO) during blowing, from addition of "quick" calcium-magnesium compounds for neutralizing the action of $SiO_2$ on the refractory lining and for liquefying and activating the slag, and from MgO from wear of the refractory lining.

In fact, during conversion, a metal/gas reaction takes place, in which carbon is burned to form gaseous CO and $CO_2$. At the end of the predetermined blowing time, the carbon content is reduced to about 0.5 kg per tonne of molten metal, which is about 500 ppm.

At the interface between the molten metal and the floating calcium-magnesium compounds, a metal/slag reaction takes place, which is intended to remove phosphorus from the molten metal. At the end of the reaction between the slag and the metal, the phosphorus content is about 0.1 kg or less per tonne of molten metal, i.e. about 100 ppm or less.

If the metal is iron and the calcium-magnesium compound is calcium lime, the chemical reaction is as follows:

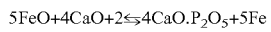
$$5FeO+4CaO+2\underset{\rightleftarrows}{}4CaO.P_2O_5+5Fe$$

The FeO (iron oxide) and the phosphorus are derived from the hot metal, whereas the CaO is added in the converter. This reaction is exothermic and the aim is to shift the equilibrium to the right-hand side. This may be achieved by lowering the temperature, fluidizing the slag as much as possible, homogenizing the metal bath (carried out by blowing argon and/or nitrogen from the bottom in most cases), maintaining the $CaO/SiO_2$ basicity index between 3 and 6 (the weight ratio of calcium oxide to silica, which is acidic), maintaining the level of magnesite at less than 9% in the slag, and creating sufficient quantities of slag.

Magnesite is typically present in the slag and is derived from wear of the refractory lining, which may be reduced by controlled addition of "quick" dolomite. However, to favour the kinetics of the reaction in the slag, the level of magnesite should be kept below 9%.

As will be understood, refining of the hot metal is not so easy, and it would need to be optimized to obtain a given amount of liquid metal, by action on the mass equilibrium of the metal, a given chemical analysis, by action on the mass equilibrium of oxygen (oxidation reaction), and a given temperature at the end of blowing (action on the thermal equilibrium).

The complexity of improving dephosphorization during refining of hot metal is due, among other things, to simultaneous observation of the three equilibria.

Such a method for dephosphorization during refining is known in the prior art from the document "Process for dephosphoritation of steel in Linz Donawitz converter (BOF converter) by pellet addition" (IN01412MU2006 A).

This patent focuses on improvement of dephosphorization during a process in a converter by cooling the slag in the second half of the process.

However, unfortunately the method disclosed requires an additional step in the method for introducing the rocks in the converter after charging the mineral additives and the standard heat-transfer medium. This consequently increases the process time, which is not an acceptable solution for the refining industry, since each second during such a refining process is very expensive.

Another method for removing phosphorus is known from the document Slag-Making Methods and Materials, patent U.S. Pat. No. 3,771,999. This patent focuses on improving dephosphorization in the method using a converter, by using products based on lime in briquettes having 0.5 to 15% of $CaCl_2$, NaCl, KCl and/or NaF.

Moreover, addition, to lime, of fluxes such as iron oxides, manganese oxides, carbon, $CaF_2$, and boron oxide, during the refining process, was found in the prior art to improve the quality of the refining process, for example for dephosphorization of molten metal.

However, addition of such fluxes typically creates additional complexity of the refining process.

There is therefore a need to supply "quick" calcium-magnesium compounds containing fluxes, in particular iron oxide.

Briquettes of "quick" calcium-magnesium compounds optionally containing fluxes are known. However, in the known calcium-magnesium compounds containing fluxes, an efflorescence effect has also been reported, which is problematic as blowing then entrains the efflorescence in the fumes (see U.S. Pat. No. 3,649,248). Moreover, it also appeared that when iron oxide is added as flux, it must be converted to ferrite, which then plays a role in acceleration of slag formation.

However, although this seems simple on paper, the iron oxide converted to ferrite quite often remains negligible, and does not then perform its role in acceleration of slag formation, which leads steelmakers to add lime on the one hand, optionally with iron, and on the other hand ferrite, optionally with lime.

Formation of calcium ferrites requires relatively high temperatures (typically 1200-1250° C.) and quite long thermal treatment times (see also U.S. Pat. No. 3,649,248). The briquettes based on quicklime (dolomitic) and iron oxide described in the prior art therefore do not lead easily to the formation of calcium ferrites.

Thus, carrying out said thermal treatment upstream of the converter has an adverse effect from the technical-economic standpoint (specific furnace, energy consumption, loss of production capacity, partial sintering, i.e. reduction of specific surface area and reduction of pore volume).

When the thermal treatment is carried out n-situ in the converter, the kinetics of formation of calcium ferrites is too slow and has an adverse effect on the performance of these briquettes for dephosphorization.

Consequently, there is not yet a product that is simple to use, not very restrictive, and that minimizes the loss of lime.

The present invention aims to solve these drawbacks, at least partly, by supplying a method allowing a considerable reduction in the loss of lime and improvement of the efficacy of the lime in slag formation.

To solve this problem, a method is provided according to the invention for making a calcium-magnesium composition in the form of briquettes, comprising the following steps:

i. supplying a homogeneous pulverulent mixture comprising at least one "quick" calcium-magnesium compound, said mixture comprising at least 40 wt % of CaO+MgO equivalent relative to the weight of said composition and having a Ca/Mg molar ratio greater than or equal to 1, preferably greater than or equal to 2, more particularly greater than or equal to 3;

ii. feeding a roller press with said homogeneous pulverulent mixture, iii. compressing said homogeneous pulverulent mixture in said roller press, obtaining a calcium-magnesium composition in the form of green briquettes, and iv. collecting said green briquettes.

The method is characterized in that said homogeneous pulverulent mixture further comprises an iron-based compound present at a content of at least 12 wt %, more preferably at least 20 wt %, preferably at least 30 wt %, more preferably at least 35 wt % of $Fe_2O_3$ equivalent relative to the weight of said composition, said iron-based compound having a very fine granulometric distribution characterized by a median size $d_{50}$ below 100 µm, preferably below 50 µm as well as a size $d_{90}$ below 200 µm, preferably below 150 µm, preferably below 130 µm, more preferably below 100 µm and in that the rollers of the roller press develop linear speeds at the periphery of the rollers between 10 and 100 cm/s, preferably between 20 and 80 cm/s, and linear pressures between 60 and 160 kN/cm, preferably between 80 and 140 kN/cm, and even more preferably between 80 and 120 kN/cm.

In a particular embodiment of the invention, said pulverulent mixture comprises at most 97 wt %, preferably at most 90 wt %, preferably at most 88%, in certain embodiments at most 60 wt % of CaO+MgO equivalent relative to the weight of said composition.

Optionally, in the method according to the present invention, step i. is carried out in the presence of a binder or a lubricant, preferably in the form of powder or concentrated aqueous suspension, more particularly selected from the group consisting of binders of mineral origin such as cements, clays, silicates, binders of vegetable or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate and mixtures thereof, preferably calcium stearate and/or magnesium stearate, at a content between 0.1 and 1 wt %, preferably between 0.15 and 0.6 wt %, more preferably between 0.2 and 0.5 wt % relative to the total weight of said briquettes.

The percentages by weight of CaO+MgO equivalent, but also $Fe_2O_3$, are determined by X-ray fluorescence spectrometry (XRF) as described in standard EN 15309. Semiquantitative chemical analysis by XRF for determining the relative concentration by weight of the elements whose atomic mass is between 16 (oxygen) and 228 (uranium) is carried out starting from samples ground to 80 µm and formed into pellets. The samples are introduced into PANalytical/MagiX Pro PW2540 apparatus, operating in wavelength dispersion mode. The measurement is performed with a power of 50 kV and 80 mA, with a Duplex detector.

The analysis results give the calcium, magnesium and iron content and these measurements are reported in weight of CaO and MgO equivalent, and in weight of $Fe_2O_3$ equivalent.

According to the present invention, it was in fact found that in contrast to the known compositions, in the briquettes according to the present invention, on the one hand owing to the fact that the mixture formed is homogeneous, but on the other hand also owing to the large amount of the iron-based compound present in the form of iron oxide, a large amount of iron oxide was converted to calcium ferrite, after thermal treatment.

However, although it had been identified in the known compositions that the granulometry of the iron oxide was not adapted, and was often too coarse, a person skilled in the art also knows that the use of fine powders in forming processes by briquetting runs counter to good practice for a person skilled in the art, since they degrade the flow properties of the mixture and therefore the feeding of the presses.

The granulometric distribution of the iron-based compound that is used in the method is determined by laser granulometry. Measurement is therefore based on the diffraction of light and follows the theories of Fraunhofer and Mie.

Notably, it is considered that the particles are spherical, non-porous and opaque. Measurement is carried out according to standard ISO 13320 in methanol, without sonication.

Moreover, it was demonstrated according to the present invention that it is not only the granulometry that makes it possible to attain a sufficient degree of conversion after thermal treatment or in the converters, but rather that it is necessary for an iron oxide to be available that is active when it is used with the "quick" calcium-magnesium compounds in the form of briquettes.

The term "iron-based compound" means for example a compound based on iron, preferably based on iron oxide, characterized by a median size $d_{50}$ below 100 µm, preferably 50 µm as well as a size $d_{90}$ below 200 µm, preferably below 150 µm, preferably below 130 µm, more preferably below 100 nm. We may then describe this iron oxide as active iron, which implies in particular that it relative to the total amount of iron oxide present in the iron-based compound, at least 40% of this iron oxide is present in the peripheral layer of the grains of the iron-based compound, said peripheral layer being defined by a thickness of 3 µm. This thus defines a volume fraction of iron oxide at the surface of the iron oxide particles that is able to react, to be converted to ferrite during thermal treatment or else directly in situ in the converter.

It is also envisaged according to the invention that the iron-based compound is in the form of a mixture of iron-based compounds, wherein said mixture of iron-based compounds may comprise one or more iron oxides, which may in their turn comprise 50 wt %, preferably 60 wt %, preferably 70 wt % of active iron oxide relative to the total weight of said iron-based compound.

The granulometric distribution of the iron-based compound in the composition in the form of briquettes is determined by scanning electron microscopy and X-ray mapping, coupled to image analysis.

Measurement is based on the property of the particles of the iron-based compound of emitting X-rays of specific energy (6.398 keV) when they are submitted to high-energy radiation (for example, a high-intensity electron beam). Detection of this radiation, combined with precise knowledge of the position of the electron beam for each point observed, makes it possible to map specifically the particles of the iron-based compound.

Each particle identified is then characterized by its particle diameter at equivalent surface area ($X_{a,i}$), as defined in standard ISO 13322-1. The particles are then classified by granulometric fraction of particle size.

In the particular conditions mentioned above, the fraction of active iron in the sense of the invention is in the peripheral layer of each particle of the iron-based compound, in the outer layer with a thickness of 3 µm. For each granulometric fraction and therefore for each particle size, it is therefore possible to calculate the fraction of iron in the peripheral layer from the formula:

$$\% Fe_{active/particle} = (V_{ext} - V_{int})/V_{ext}$$

where $V_{ext}$ is the volume of the particle of the iron-based compound and $V_{int}$ is the volume at the core of the particle at more than 3 µm from the surface, i.e. the volume corresponding to a spherical particle having a radius reduced by 3 nm.

Considering the particles to be perfectly spherical, the following formula is obtained for the particles whose diameter is greater than 6 µm:

$$\% Fe_{active/particle>6\ \mu m} = [(D_{ext})^3 - (D_{ext}-6)^3]/(D_{ext})^3$$

where $D_{ext}$ is the diameter of the particle expressed in µm, or the size of the particle in the sense of laser granulometry.

The following formula is obtained for the particles whose diameter is under 6 µm:

$$\% Fe_{active/particle<6\ \mu m} = 100\%$$

The fraction of total active iron in the sense of the invention is therefore the sum of all the granulometric fractions of the fraction of active iron multiplied by the percentage by volume of each granulometric fraction obtained by laser granulometry $$\% Fe_{active} = \Sigma \%_{volume/particle} \cdot \% Fe_{active/particle}$$

Consequently, to have sufficient active iron oxide in the iron-based compound present in the briquettes produced by the method according to the present invention, the percentage of active iron must be at least 40%.

As can be seen, according to the present invention, it is not sufficient to have a fine granulometry, it is in fact necessary to attain the percentage of active iron oxide in the iron-based compound present in the briquettes, which makes t possible to attain sufficient conversion to ferrite during preliminary thermal treatment or in a converter.

Moreover, in the method according to the present invention, it was found that said active iron oxide did not have an adverse effect on the mechanical strength of the briquettes formed, even at a high content of 60 wt % relative to the total weight of the green briquettes.

Furthermore, formation of these green briquettes with a high content of iron oxide gives briquettes supplying simultaneously fluxes such as iron oxide ($Fe_2O_3$), but also the required ferrites, because even if the green briquettes do not contain ferrites directly, the ferrites can be formed directly in situ, for example in the converters in which the briquettes are used.

The method according to the present invention therefore makes it possible to obtain briquettes of calcium-magnesium compounds whose mechanical strength is not impaired by adding fluxes, even without thermal treatment for contents of iron oxide below 40 wt % of the composition of the green briquette, in which the iron oxide has a very fine granulometric distribution characterized by a median size $d_{50}$ below 100 µm, preferably 50 µm as well as a size $d_{90}$ below 200 µm, preferably below 150 µm, preferably below 130 µm, more preferably below 100 µm, and which moreover is very flexible and has good performance, without the aforesaid constraints.

In the sense of the present invention, said iron-based compound may be formed from one or more iron-based compounds, together totaling a content in the composition of at least 12 wt %, more preferably at least 20 wt %, preferably at least 30 wt %, more preferably at least 35 wt %.

In another preferred embodiment according to the invention, said iron-based compound has a granulometric distribution characterized by a $d_{50}$ less than or equal to 80 µm, preferably less than or equal to 60 µm.

In the sense of the present invention, unless stated otherwise, the notation $d_x$ represents a diameter expressed in µm, measured by laser granulometry in methanol without sonication, relative to which x vol % of the particles measured are less than or equal.

In a particular embodiment, the method according to the present invention further comprises thermal treatment of said green briquettes collected at a temperature between 900° C. and 1200° C., preferably between 1050° C. and 1200° C. inclusive, more preferably between 1100° C. and 1200° C. inclusive. The thermal treatment is carried out preferably for a predetermined time between 3 and 20 minutes, preferably greater than or equal to 5 minutes and less than or equal to 15 minutes, with formation and production of thermally treated briquettes, in which said iron oxide has been converted to calcium ferrite, i.e. thermally treated briquettes comprising a "quick" calcium-magnesium compound and an iron-based compound comprising at least calcium ferrite, the iron-based compound comprising at least calcium ferrite, which is present at a content of at least 12%, more preferably at least 20%, preferably at least 30%, more preferably at least 35% in $Fe_2O_3$ equivalent.

When the thermal treatment is carried out in "multilayer" conditions, i.e. when the briquettes are in the form of a static bed of briquettes of a certain thickness, it will be understood that the thermal treatment time can be increased to allow time for the heat to penetrate to the centre of the bed of briquettes. In conditions with temperatures less than or equal to 1200° C., thermal treatment makes it possible to obtain thermally treated briquettes comprising a calcium-magnesium compound and an iron-based compound containing calcium ferrite, with little or no change in its porosity and specific surface area, and whose mechanical strength has been improved. In other words, the phenomenon of sintering of the briquettes is avoided at these temperatures. These relatively high porosity characteristics allow rapid dissolution of the thermally treated briquettes in the slag in a metallurgical refining process.

Thus, it was observed that briquettes obtained by the method according to the present invention not only have a sufficiently high content of calcium ferrite, but the briquettes have particularly interesting mechanical strength represented by the shatter test index.

In fact, in certain embodiments of the method according to the present invention, the thermally treated briquettes have a shatter test index below 8%, sometimes below 6%, below 4%, below 3%, or even around 2%.

This means that according to the present invention, we have been able to produce very strong briquettes, whose loss due to broken briquettes or to the formation of fines during transport is reduced significantly and it is possible to overcome the drawbacks of the known briquettes, which quite often generate a loss even exceeding 20% of quicklime owing to the generation of fines during transport to the steelmaking shop and owing to handling and transport within the steelmaking shop.

In yet another particularly advantageous embodiment, said "quick" calcium-magnesium compound is a soft- or medium-burned calcium-magnesium compound, preferably soft-burned.

In fact, in the method according to the present invention, it is advantageous if the calcium-magnesium compound supplied in the form of a homogeneous mixture is itself also sufficiently reactive, so as to form cohesive briquettes with the iron-based compound after thermal treatment. Moreover, for use in converters for forming slag, it is advantageous for the "quick" calcium-magnesium compound to be sufficiently reactive.

The "quick" calcium-magnesium compounds, like quicklime, are produced industrially by baking natural limestones in various types of kilns, such as shaft kilns (dual-flow regenerative kilns, annular kilns, standard shaft kilns, etc.) or else rotary kilns. The quality of the calcium-magnesium compound, such as quicklime for example, notably its reactivity with water, and the consistency of this quality, are partly linked to the type of kiln used, the operating conditions of the kiln, the nature of the limestone from which the "quick" calcium-magnesium compound is derived per se, or else the nature and the amount of fuel used. Thus, it is theoretically possible to produce a whole range of "quick" calcium-magnesium compounds, for example quicklime with reactivities with water ranging from the most explosive to the slowest.

Advantageously, said "quick" calcium-magnesium compound is quicklime.

In general, production of quicklime by mild baking (900-1000° C.) makes it possible to obtain rather reactive lime, whereas production of lime of low reactivity involves overburning at higher temperature (1200-1400° C.). Overburning quite often leads to the production of quicklime of less stable quality in terms of reactivity with water as the calcining operation is carried out in a thermal zone where the textural development of the quicklime is fairly sensitive. This overburned quicklime is moreover more expensive to produce than a milder quicklime as it requires the use of higher temperatures, but also because, unless dedicated kilns are used, production of this overburned quicklime leads to pauses in production campaigns to alternate with the production of mild quicklimes, which are more commonly used, which is not without problems in stabilization of the calcination conditions and therefore problems in stabilization of quality.

Quicklimes obtained by mild baking generally have specific surface areas measured by nitrogen adsorption manometry after vacuum degassing at 190° C. for at least 2 hours, calculated by the multiple-point BET method as described in standard ISO 9277:2010E, above 1 $m^2/g$ whereas the overburned quicklimes generally have surface areas well below 1 $m^2/g$.

In the context of this invention, the reactivity of quicklime is measured using the water reactivity test of European standard EN 459-2:2010 E. Thus, 150 g of quicklime is added with stirring to a cylindrical Dewar of 1.7 $dm^3$ capacity containing 600 $cm^3$ of deionized water at 20° C. The quicklime is supplied in the form of fines with a size between 0 and 1 mm. Stirring at 250 revolutions per minute is carried out with a specific paddle. The temperature variation is measured as a function of time, making it possible to plot a curve of reactivity. The value of tan, which is the time taken to reach 60° C., can be found from this curve.

The reactivity of burned dolomite is measured using this same reactivity test. In this case, 120 g of burned dolomite is added with stirring to a cylindrical Dewar of 1.7 $dm^3$ capacity containing 400 $cm^3$ of deionized water at 40° C. The burned dolomite is supplied in the form of fines with a size between 0 and 1 mm. Stirring at 250 revolutions per minute is carried out by means of a specific paddle. The temperature variation is measured as a function of time, making it possible to plot a curve of reactivity. The value of $t_{70}$, which is the time taken to reach 70° C., can be found from this curve.

The composition according to the present invention comprises a soft- or medium-burned calcium-magnesium compound, preferably soft-burned, which is therefore necessarily relatively reactive, thus supplying reactive briquettes.

According to the present invention, a soft- or medium-burned calcium-magnesium compound, preferably soft-burned, is characterized by a value of to below 10 min, preferably 8 min, preferably 6 min, and more preferably 4 min when the calcium-magnesium compound is a quicklime and by a value of to below 10 min, preferably 8 min, preferably 6 min, and more preferably 4 min when the calcium-magnesium compound is a burned dolomite.

In a particular embodiment of the method according to the present invention, the method comprises, before said supplying of a pulverulent mixture:

i. feeding a mixer with at least 40 wt % of a "quick" calcium-magnesium compound expressed in CaO+MgO equivalent relative to the weight of said composition and with at least 12 wt %, more preferably at least 20 wt %, preferably at least 30 wt %, more preferably at least 35 wt % of an iron-based compound expressed in $Fe_2O_3$ equivalent relative to the weight of said composition, said iron-based compound having a very fine granulometric distribution characterized by a median size ds, below 100 μm, preferably 50 μm as well as a size $d_{90}$ below 200 μm, preferably below 150 μm, preferably below 130 μm, more preferably below 100 μm; and ii. mixing said "quick" calcium-magnesium compound with said iron-based compound for a predetermined length of time, sufficient to obtain an approximately homogeneous pulverulent mixture of said "quick" calcium-magnesium compound and of said iron-based compound.

More particularly, in the method according to the present invention, although a binder or lubricant may be added directly at the level of feeding the roller press, said binder or lubricant is added to the mixer, wherein said binder or lubricant is included in said homogeneous pulverulent mixture.

In another particular embodiment of the method according to the present invention, said calcium-magnesium compound contains at least 10 wt % of quicklime in the form of ground particles relative to the weight of said composition.

Advantageously, said calcium-magnesium compound according to the present invention contains at least 40 wt %, preferably at least 50 wt %, preferably at least 60 wt %, particularly at least 65 wt %, in particular at least 70 wt %, preferably at least 80 wt %, advantageously at least 90 wt %, or even 100 wt % of quicklime in the form of ground particles relative to the weight of said composition.

"Quicklime in the form of ground particles" refers to the lime fines resulting from grinding quicklime and therefore corresponding to a size reduction of the limestone. Grinding may be carried out either starting from the ungraded material leaving the furnace and/or leaving the storage bin or starting from the ungraded material leaving the furnace and/or leaving the storage bin, screened beforehand. Grinding may be carried out using different types of grinding mills (impact crusher, hammer crusher, double roll crusher, cone crusher, etc.), either in open circuit (no recycling loop), or in closed circuit (recycling loop).

Quicklime in the form of ground particles (also called ground lime) differs from screened lime. Screened lime means the lime fines resulting from screening of lime. The granulometry is defined by the size of the screen. For example, a lime screened at 3 mm gives a 0-3 mm screened lime. Thus, screening of the ungraded material leaving the furnace leads to a "primary" screened lime. Screening of the ungraded material leaving the storage bin leads to a "secondary" screened lime.

In the sense of the present invention, quicklime in the form of ground particles means lime fines generally containing more very fine particles than the lime fines from screening. Thus, if we consider for example 0-3 mm fines, quicklime fines in the form of ground particles will typically contain at least 30 wt %, most often at least 40 wt %, or even at least 50 wt % of very fine particles under 100 μm, whereas screened lime fines will often contain at most 25 wt %, or even at most 15 wt % of very fine particles under 100 μm.

The chemical composition of the fines of ground lime is generally more uniform than that of the screened lime fines. Thus, if we consider for example a 10-50 mm limestone calcined with an ash-generating fuel such as coal (lignite, hard coal, anthracite, etc.) or else petroleum coke, and characterize the 0-3 mm fines resulting from grinding or screening of this limestone, it will be found that the 0-200 μm fraction of the 0-3 mm fines resulting from grinding has a similar chemistry to that of the 200 μm-3 mm fraction, whereas the 0-200 μm fraction of the 0-3 mm fines resulting from screening contains more impurities than the 200 μm-3 mm fraction.

The fines of ground lime are in general more reactive than the screened lime fines. Thus, for soft-burned quicklime, if we measure the reactivity with water (standard EN459) of the 0-3 mm fines, the fines from grinding typically have values of to below 5 min whereas the fines from primary screening often have values of $t_{60}$ above 5 min.

In fact it was found, surprisingly, without it being possible at present to explain why, that addition of quicklime in the form of ground particles at a concentration of at least 10 wt % relative to the weight of the briquettes made it possible to obtain a greatly improved drop strength. A content as limited as 10 wt % makes it possible to obtain a significant improvement in mechanical strength, although the content of ground particles may be up to 100 wt %.

More particularly, said quicklime n the form of ground particles is a soft-burned or medium-burned quicklime, preferably soft-burned, said quicklime in the form of ground particles being characterized by a value of to below 10 min, preferably below 8 min, preferably below 6 min, and more preferably below 4 min.

In a preferred embodiment of the method according to the present invention, the method further comprises a pre-treatment step of the briquettes under modified atmosphere containing at least 2 vol % $CO_2$ and at most 30 vol % $CO_2$, preferably at most 25 vol % $CO_2$, preferably at most 20 vol % $CO_2$, more preferably at most 15 vol % $CO_2$, even more preferably at most 10 vol % $CO_2$ with respect to the modified atmosphere.

It has been indeed identified according to the present invention that a pre-treatment under such modified atmosphere containing such $CO_2$ % with respect to the modified atmosphere allows to increase the mechanical strength of the briquettes.

Other embodiments of the method according to the invention are presented in the accompanying claims.

The invention also relates to a composition in the form of green briquettes comprising at least one "quick" calcium-magnesium compound and an iron-based compound, characterized in that the composition comprises at least 40 wt % of CaO+MgO equivalent relative to the weight of said composition, said composition having a Ca/Mg molar ratio greater than or equal to 1, preferably greater than or equal to 2, more preferably greater than or equal to 3 and characterized in that said iron-based compound is present at a content of at least 12 wt %, more preferably at least 20 wt %, preferably at least 30 wt %, more preferably at least 35 wt % of $Fe_2O_3$ equivalent relative to the weight of said composition, said iron-based compound having a very fine granulometric distribution characterized by a median size $d_{50}$ below 100 μm, preferably below 50 μm and a size $d_{90}$ below 200 μm, preferably below 150 an, preferably below 130 μm, more preferably below 100 μm, said composition having a shatter test index less than or equal to 20% for contents of iron oxide below 40%.

This mechanical strength, evaluated by the shatter test, for green briquettes having contents of iron-based compound below 40% is particularly interesting because these green briquettes may subsequently be thermally treated, according to one embodiment of the invention, in a rotary kiln in which these briquettes are therefore submitted to repeated drops.

In the sense of the present invention, said "quick" calcium-magnesium compound comprises one or more "quick" calcium-magnesium compounds. The "quick" calcium-magnesium compound is selected from the group consisting of quicklime (calcium lime), magnesian lime, dolomitic quicklime, calcined dolomite and mixtures thereof, preferably in the form of particles, such as particles resulting from screening, from grinding, dusts from filters and mixtures thereof. Said "quick" calcium-magnesium compound may therefore be regarded as a calcium-magnesium component of the composition in the form of briquettes, which may contain other compounds.

In a particular embodiment of the invention, said pulverulent mixture comprises at most 97 wt %, preferably at most 90 wt %, preferably at most 88%, in certain embodiments at most 60 wt % of CaO+MgO equivalent relative to the weight of said composition.

The present invention also relates to a composition in the form of thermally treated briquettes, comprising at least one iron-based compound, said composition comprising at least 40 wt % of CaO+MgO equivalent relative to the weight of said composition and having a Ca/Mg molar ratio greater than or equal to 1, preferably greater than or equal to 2, more preferably greater than or equal to 3, characterized in that said iron-based compound is present at a content of at least 12 wt %, more preferably at least 20 wt %, preferably at least 30 wt %, more preferably at least 35 wt % of $Fe_2O_3$ equivalent relative to the weight of said composition, said iron-based compound comprising at least 40%, preferably at least 60%, preferably at least 80%, and even more preferably at least 90% of calcium ferrite, expressed by weight of $Fe_2O_3$ equivalent, relative to the total weight of said iron-based compound expressed by weight of $Fe_2O_3$ equivalent.

Calcium ferrite is represented by the following formulae: $CaFe_2O_4$ and/or $Ca_2Fe_2O_5$.

In a particular embodiment of the invention, said pulverulent mixture comprises at most 97 wt %, preferably at most 90 wt %, preferably at most 88 wt %, in certain embodiments at most 60 wt % of CaO+MgO equivalent relative to the weight of said composition.

In a particular embodiment of the present invention, when the composition is in the form of thermally treated briquettes, said "quick" calcium-magnesium compound comprises at least 10 wt %, preferably 20 wt %, more preferably 30 wt %, more preferably 40 wt % of CaO+MgO equivalent, relative to the total weight of said composition.

Preferably, whether the composition is in the form of green or thermally treated briquettes, said "quick" calcium-magnesium compound comprises fine particles of calcium-magnesium compound selected from fine particles rejected in screening in the production of pebbles of said "quick" calcium-magnesium compound, calcium-magnesium filter dusts at a concentration from 0 wt % to 90 wt % relative to the total weight of said "quick" calcium-magnesium compound and from 10 to 100 wt % of quicklime in the form of ground particles, relative to the total weight of said "quick" calcium-magnesium compound.

Preferably, whether the composition is in the form of green or thermally treated briquettes, said "quick" calcium-magnesium compound contains from 0 to 100 wt % of quicklime in the form of particles ground from pebbles of said calcium-magnesium compound.

In a preferred variant of the present invention, whether the composition is in the form of green or thermally treated briquettes, said "quick" calcium-magnesium compound contains from 0 to 90 wt % of fine particles rejected in screening in the production of pebbles of said calcium-magnesium compound and from 10 to 100 wt % of quicklime in the form of ground particles, relative to the total weight of said calcium-magnesium compound.

Advantageously, in the green or thermally treated briquettes, said quicklime in the form of ground particles is present at a concentration of at least 15 wt %, in particular at least 20 wt %, more preferably at least 30 wt %, especially preferably at least 40 wt % relative to the weight of the composition.

More particularly, whether the composition is in the form of green or thermally treated briquettes, said "quick" calcium-magnesium compound is a soft- or medium-burned calcium-magnesium compound, preferably soft-burned.

When quicklime in the form of ground particles is present, said quicklime in the form of ground particles is a soft-burned or medium-burned quicklime, preferably soft-burned.

More particularly, according to the present invention, when the composition is in the form of green briquettes, said composition has a BET specific surface area greater than or equal to 1 m$^2$/g, preferably greater than or equal to 1.2 m$^2$/g, more preferably greater than or equal to 1.4 m$^2$/g.

Advantageously, according to the present invention, when the composition is in the form of green briquettes, said composition has a porosity greater than or equal to 20%, preferably greater than or equal to 22%, more preferably greater than or equal to 24%.

The term "porosity of the composition in the form of briquettes" means, in the sense of the present invention, the total mercury pore volume determined by mercury intrusion porosimetry according to part 1 of standard ISO 15901-1: 2005E, which consists of dividing the difference between the skeletal density, measured at 30000 psia, and the apparent density, measured at 0.51 psia, by the skeletal density.

Alternatively, porosity may also be measured by kerosene intrusion porosimetry. The density and the porosity of the briquettes are determined by kerosene intrusion, according to a measurement protocol derived from standard EN ISO 5017. The measurements are performed on 5 briquettes.

The density of the briquettes is calculated according to the formula m1/(m3−m2)×Dp and the percentage porosity according to the formula (m3−m1)/(m3−m2)×100.

m1 is the weight of these 5 briquettes, m2 is the weight of these 5 briquettes immersed in kerosene and m3 is the weight of these 5 "wet" briquettes, i.e. impregnated with kerosene. Dp is the density of the kerosene.

More particularly, according to the present invention, when the composition is in the form of green briquettes and the calcium-magnesium compound is mainly quicklime, said composition has a value of reactivity to below 10 min, preferably below 8 min, preferably below 6 min and even more preferably below 4 min. To take into account the content of iron-based compound in the composition, a little more than 150 g of said composition is added in the reactivity test, to have the equivalent of 150 g of quicklime added.

Advantageously, according to the present invention, when the composition is in the form of green briquettes and the calcium-magnesium compound is mainly burned dolomite, said composition has a value of reactivity $t_{70}$ below 10 min, preferably below 8 min, preferably below 6 min and even more preferably below 4 min. To take into account the content of iron-based compound in the composition, a little more than 120 g of said composition is added in the reactivity test to have the equivalent of 120 g of burned dolomite added.

More particularly, according to the present invention, when the composition is in the form of thermally treated briquettes, said composition has a BET specific surface area greater than or equal to 0.4 ma/l preferably greater than or equal to 0.6 m²/g, more preferably greater than or equal to 0.8 ma/g.

Advantageously, according to the present invention, when the composition is in the form of thermally treated briquettes, said composition has a porosity greater than or equal to 20%, preferably greater than or equal to 22%, more preferably greater than or equal to 24%.

More particularly, according to the present invention, when the composition is in the form of thermally treated briquettes and the calcium-magnesium compound is mainly quicklime, said composition has a value of $t_{50}$ below 10 min, preferably below 8 min, preferably below 6 min and even more preferably below 4 min. To take into account the content of iron-based compound in the composition, a little more than 150 g of said composition is added in the reactivity test to have the equivalent of 150 g of "free" quicklime added. "Free" quicklime means quicklime that has not reacted with iron oxide to give calcium ferrites $CaFe_2O_4$ and/or $Ca_2Fe_2O_5$.

In a preferred embodiment of the present invention, whether the composition is in the form of green or thermally treated briquettes, said at least one calcium-magnesium compound is formed from particles under 7 mm. Alternatively, said at least one calcium-magnesium compound is formed from particles under 5 mm. In another variant according to the present invention, said at least one calcium-magnesium compound is formed from particles under 3 mm.

In yet another variant of the present invention, whether the composition is in the form of green or thermally treated briquettes, said at least one calcium-magnesium compound is a mixture of particles under 7 mm and/or of particles under 5 mm and/or of particles under 3 mm.

In one embodiment of the invention, the composition in the form of green or thermally treated briquettes further comprises a binder or a lubricant, more particularly selected from the group consisting of binders of mineral origin such as cements, clays, silicates, binders of vegetable or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate and mixtures thereof, preferably calcium stearate and/or magnesium stearate, at a content between 0.1 and 1 wt %, preferably between 0.15 and 0.6 wt %, more preferably between 0.2 and 0.5 wt % relative to the total weight of the composition.

The composition according to the present invention is a composition of green or thermally treated briquettes produced in industrial volumes and packaged in types of containers having a volume of contents greater than 1 m³ such as big bags, containers, silos and the like, preferably sealed.

Advantageously, the briquettes of the composition in the form of green briquettes have a shatter test index below 10%, for contents of iron oxide below 20 wt % of the composition.

Advantageously, the briquettes of the composition in the form of thermally treated briquettes have a shatter test index below 8%, more particularly below 6%, regardless of the content of iron-based compound.

Advantageously, whether the composition is in the form of green or thermally treated briquettes, said briquettes have a largest dimension of at most 50 mm, preferably at most 40 mm, more preferably at most 30 mm. This means that the briquettes of the composition in the form of briquettes pass through a screen with square mesh with side of respectively 50 mm, preferably 40 mm, and in particular 30 mm.

Preferably, said green or thermally treated briquettes have a largest dimension of at least 10 mm, preferably at least 15 mm, more preferably at least 20 mm.

The term "a largest dimension" means a characteristic dimension of the green or thermally treated briquette that is largest, whether it is the diameter, length, width, thickness, preferably in the longitudinal direction of the briquette of oblong shape.

Preferably, whether the composition is in the form of green or thermally treated briquettes, said at least one calcium-magnesium compound is "quick" dolomite.

Alternatively, whether the composition is in the form of green or thermally treated briquettes, said at least one calcium-magnesium compound is quicklime.

Advantageously, said green or thermally treated briquettes have an average weight per briquette of at least 5 g preferably at least 10 & more preferably at least 12 g, and in particular at least 15 g.

According to the present invention, said green or thermally treated briquettes have an average weight per briquette less than or equal to 100 g, preferably less than or equal to 60 g. more preferably less than or equal to 40 g and in particular less than or equal to 30 g.

Advantageously, said green or thermally treated briquettes have an apparent density between 2 g/cm³ and 3.0 g/cm³, advantageously between 2.2 g/cm³ and 2.8 g/cm³.

Other embodiments of the composition in the form of green or thermally treated briquettes according to the invention are presented in the accompanying claims.

The invention also relates to use of a composition in the form of green briquettes or in the form of thermally treated briquettes according to the present invention in iron and steel metallurgy, in particular in oxygen converters or in arc furnaces.

More particularly, the green or thermally treated briquettes according to the present invention are used in oxygen converters or in arc furnaces, mixed with briquettes of "quick" calcium-magnesium compounds or with pebbles of "quick" calcium-magnesium compounds.

In fact, during the first minutes of the refining process, there s insufficient slag available in the reaction vessel for effective commencement of the reaction of dephosphorization in the methods of the prior art. The use of the composition according to the present invention, i.e. doped with fluxes, which melts more quickly than limestone, helps to form a liquid slag earlier at the start of the process, in comparison with the conventional methods, owing to homogeneous mixing and shaping of this homogenized mixture, which makes it possible to accelerate the slag forming process even more and minimize the formation of slag components of high melting point, such as the calcium silicates that usually form in the aforementioned method of the prior art.

The invention also relates to the use of a composition in the form of green briquettes or in the form of thermally treated briquettes in a process for refining molten metal, in particular the dephosphorization of molten metal and/or desulphurization of molten metal and/or reduction of losses of refined metal in the slag.

The use or a composition in the form of green briquettes or in the form of thermally treated briquettes according to the present invention in a process for refining molten metal comprises at least one step of introducing hot metal and optionally iron-based scrap in a vessel, at least one step of introducing a composition in the form of green briquettes or in the form of thermally treated briquettes according to the present invention, preferably in the form of thermally treated briquettes according to the present invention, at least one step of blowing oxygen into said vessel, at least one step of forming a slag with said composition of briquettes in said vessel, at least one step of obtaining refined metal having a reduced content of phosphorus compounds and/or sulphur compounds and/or an increased content of refined metal starting from hot metal by dephosphorization and/or desulphurization, and at least one step of discharging said refined metal having a reduced content of phosphorus-containing and/or sulphur-containing components and/or an increased content of refined metal.

The use according to the present invention further comprises a step of adding quicklime, preferably quicklime in lumps or quicklime compacts, especially quicklime tablets or briquettes.

Other forms of use according to the invention are presented in the accompanying claims.

Other features, details and advantages of the invention will become clear from the description given hereunder, which is non-limiting and refers to the examples and to the figures.

Figure 1:
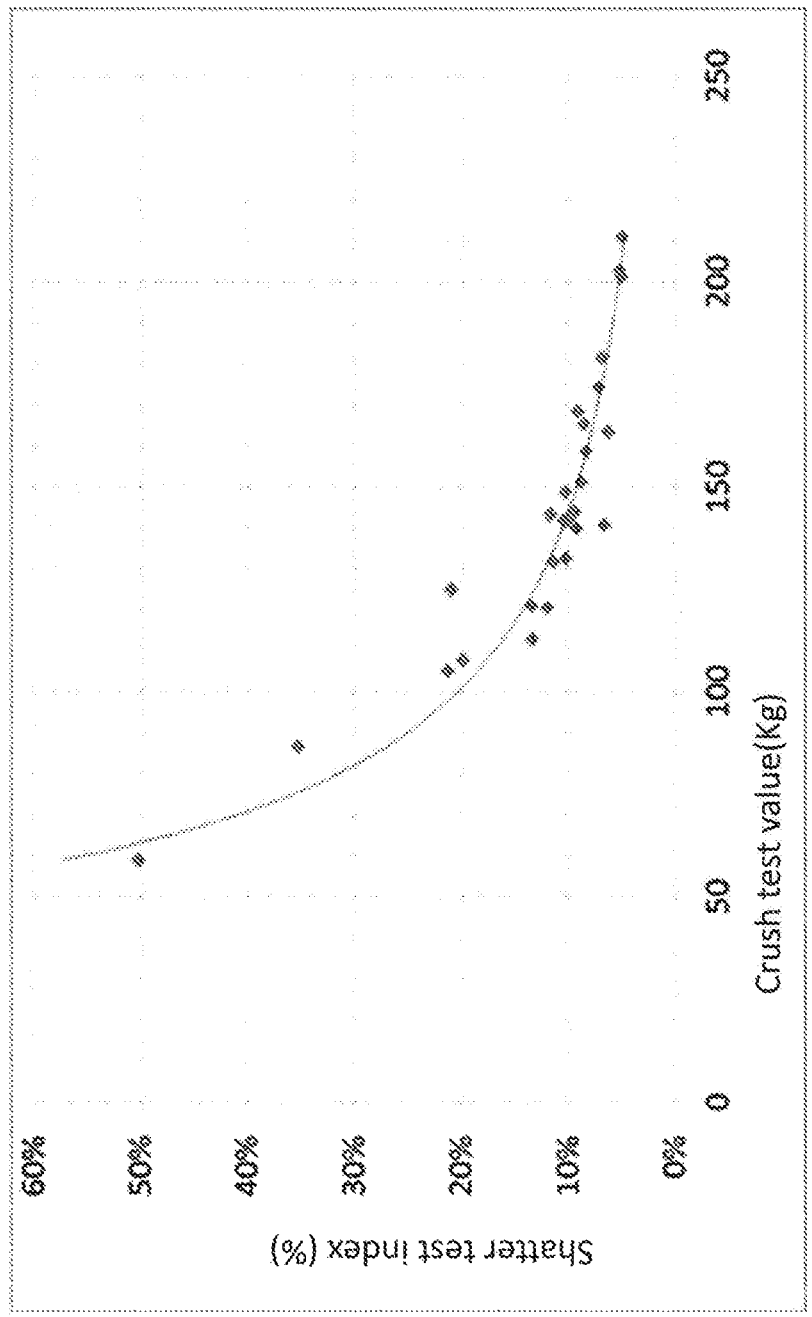
FIG. 1 shows the correlation between the shatter test index and the compressive force on different samples of briquettes of calcium-magnesium compound and optionally of iron-based compound.

The present invention relates to a method for briquetting fine particles of calcium-magnesium compounds and iron-based compound, said iron-based compound having a very fine granulometric distribution characterized by a median size $d_{50}$ below 100 µm, preferably below 50 µm as well as a size $d_{90}$ below 200 µm, preferably below 150 µm, preferably below 130 µm, more preferably below 100 µm.

The method of briquetting according to the invention comprises supplying an approximately homogeneous pulverulent mixture comprising at least 40 wt % of CaO+MgO equivalent of a "quick" calcium-magnesium compound and at least 12 wt %, more preferably at least 20 wt %, preferably at least 30 wt %, more preferably at least 35 wt % of an iron-based compound expressed in $Fe_2O_3$ equivalent relative to the weight of said composition.

In a particular embodiment of the invention, said pulverulent mixture comprises at most 97 wt %, preferably at most 90 wt %, preferably at most 88%, in certain embodiments at most 60 wt % of CaO+MgO equivalent relative to the weight of said composition.

The homogeneous mixture in which the iron-based compound is uniformly distributed is fed into a roller press, also sometimes called a tangential press, for example a Komarek, Sahut Konreur, Hosokawa Bepex, or Köppern press. In the roller press, the approximately homogeneous pulverulent mixture is compressed, optionally in the presence of a binder or a lubricant, more particularly selected from the group consisting of binders of mineral origin such as cements, clays, silicates, binders of vegetable or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate, and mixtures thereof, preferably calcium stearate and/or magnesium stearate, at a content between 0.1 and 1 wt %, preferably between 0.15 and 0.6 wt %, more preferably between 0.2 and 0.5 wt % relative to the total weight of said briquettes.

In operation, the rollers of the roller press develop linear speeds at the periphery of the rollers between 10 and 100 cm/s, preferably between 20 and 80 cm/s, and linear pressures between 60 and 160 kN/cm, preferably between 80 and 140 kN/cm, and even more preferably between 80 and 120 kN/cm.

Assuming an angle of X degree at which the linear pressure is applied on the surface of the hoops, the surface pressure can be calculated, which is equal to the linear pressure divided by $(½·π·D)/360$, where D is the diameter of the hoops in cm. The surface pressure is between 300 and 500 MPa, preferably between 300 and 450 MPa, and more preferably between 350 and 450 MPa.

After compression, the calcium-magnesium composition is obtained in the form of green briquettes, which are collected.

In a preferred embodiment of the method according to the present invention, the green briquettes collected are treated thermally at a temperature between 900° C. and 1200° C., preferably between 1050° C. and 1200° C., more preferably between 1100° C. and 1200° C. inclusive. The thermal treatment is carried out preferably for a predetermined time of between 3 and 20 minutes, obtaining thermally treated briquettes in which said iron oxide is converted to calcium ferrite, i.e. thermally treated briquettes comprising a "quick" calcium-magnesium compound and a calcium ferrite compound present at a content of at least 12%, more preferably at least 20%, preferably at least 30%, more preferably at least 35% of $Fe_2O_3$ equivalent.

In one embodiment of the invention, said thermal treatment of the green briquettes is carried out in a rotary kiln at high temperature. Preferably, the rotary kiln is used for thermal treatment of briquettes whose iron oxide content is below 40%.

Alternatively, the thermal treatment is carried out in a horizontal kiln, for example a tunnel kiln, a through-type kiln, a car-type kiln, a roller kiln or a mesh band kiln. As a variant, any other type of conventional kiln may be used, provided it does not cause a change in the integrity of the compacts, for example through excessive attrition.

Cooling may either be performed conventionally in the downstream part of the kiln, or outside the kiln, for example in a vertical cooler in countercurrent for the cooling air or else in a fluidized-bed cooler with cooling air in the case of quenching.

In a particular embodiment, cooling at the end of the thermal treatment is carried out quickly, in less than 15 min, preferably in less than 10 min, in a fluidized bed with cooling air.

In a preferred embodiment according to the present invention, the method comprises, before said supplying of a homogeneous pulverulent mixture, i. feeding a powder mixer with at least 40 wt % of CaO+MgO equivalent of a "quick" calcium-magnesium compound and with at least 12%, more preferably at least 20%, preferably at least 30%, more preferably at least 35% of an iron-based compound expressed in $Fe_2O_3$ equivalent having a very fine granulometric distribution characterized by a median size $d_{50}$ below 100 µm, preferably below 50 µm as well as a size do below 200 µm, preferably below 150 nm, preferably below 130 µm, more preferably below 100 µm; and ii. mixing said "quick" calcium-magnesium compound with said iron-based compound for a predetermined length of time, sufficient to obtain an approximately homogeneous pulverulent mixture of said "quick" calcium-magnesium compound and of said iron-based compound.

In a variant of the invention, the calcium-magnesium compound comprises at least 10 wt % of ground quicklime particles, preferably at least 20 wt %, more particularly at least 30 wt % and at most 100 wt % relative to the total weight of said calcium-magnesium compound.

The "green" briquettes are based on quicklimes (optionally dolomitic) and ultrafine particles of iron oxide. They are characterized by an iron content by weight of at least 12 wt %, more preferably at least 20 wt %, preferably at least 30 wt %, more preferably at least 35 wt % expressed in $Fe_2O_3$ equivalent. The green briquettes are also characterized by a content by weight of calcium and magnesium of at least 40 wt %, expressed in CaO and MgO equivalent. Chemical analysis is performed by X-ray fluorescence spectrometry (XRF) according to standard EN 15309.

Semiquantitative chemical analysis by XRF for determining the relative concentration by weight of the elements whose atomic mass is between 16 (oxygen) and 228 (uranium) is carried out starting from the samples ground to 80 µm and formed into pellets. The sample is excited by a high-energy source (primary X-rays), and on recovering its original state of excitation, the sample emits secondary X-rays, characteristic of the chemical elements making up the sample.

The samples are put in a PANalytical/MagiX Pro PW2540 apparatus, operating in wavelength dispersion mode. Measurement is performed with a power of 50 kV and 80 mA, with a Duplex detector.

The analysis results give the calcium, magnesium and iron content and these measurements are reported in weight of CaO and MgO equivalent, and weight of $Fe_2O_3$ equivalent.

Semiquantitative analysis of the iron-based compounds (iron oxides $Fe_2O_3$, $Fe_3O_4$, calcium ferrites $CaFe_2O_4$, $Ca_2Fe_2O_3$) is carried out based on an X-ray diffraction pattern by the Rietveld method.

This method consists of simulating a diffraction pattern using a crystallographic model of the sample, then adjusting the parameters of this model so that the simulated diffraction pattern is as close as possible to the experimental diffraction pattern. At the end of semiquantitative analysis, it is verified that the total amount of iron expressed in $Fe_2O_3$ equivalent does not differ by more than 10% relative to the values obtained by XRF. The percentage of total iron in the form of calcium ferrites is obtained by simple division (Fe in the ferrites divided by Fe in all of the iron-based compounds).

The green briquettes are also characterized by a BET specific surface area greater than or equal to 1 $m^2/g$, preferably 1.2 $m^2/g$, preferably 1.4 $m^2/g$.

The porosity of the green briquettes is greater than or equal to 20%, preferably 22%, preferably 24%.

The green briquettes have an apparent density between 2.0 and 3.0 and preferably between 2.2 and 2.8.

The briquettes have good resistance to ageing. Thus, when they are exposed to a humid atmosphere containing for example 5 to 15 $g/m^3$ of absolute humidity, degradation of their mechanical properties (STI) only occurs beyond 1.5% of weight increase, preferably 2% of weight increase, and more preferably 2.5% of weight increase, following the reaction of hydration of quicklime CaO to slaked lime $Ca(OH)_2$.

The thermally treated briquettes comprise a calcium-magnesium compound, for example quicklimes (dolomitic) and an iron-based compound, containing ultrafine particles of iron oxide and calcium ferrites $CaFe_2O_4$ and/or $CaFe_2O_3$.

The thermally treated briquettes are characterized by an iron content by weight of at least 12 wt %, more preferably at least 20 wt %, preferably at least 30 wt %, more preferably at least 35 wt % expressed in $Fe_2O_3$ equivalent. They are also characterized by a content by weight of calcium and magnesium of at least 40 wt % expressed in CaO and MgO equivalent. Chemical analysis is carried out by XRF, as mentioned above.

At least 40%, preferably at least 50%, preferably at least 60% and more preferably at least 70% of the total iron is in the form of calcium ferrites.

Quantification of the calcium ferrites is performed by XRD/Rietveld analysis after grinding the briquettes, as for the green briquettes.

The thermally treated briquettes of the present invention have a shatter test index ("STI", i.e. percentage by weight of fines below 10 mm after 4 drops from 2 m) below 6%, regardless of the content of iron-based compounds.

They are also characterized by a specific surface area greater than or equal to 0.4 $m^2/g$, preferably 0.5 $m^2/g$, preferably 0.6 $m^2/g$.

The porosity is greater than or equal to 20%, preferably 22% preferably 24%.

The thermally treated briquettes have an apparent density between 2.0 and 3.0 and preferably between 2.2 and 2.8.

The thermally treated briquettes have good resistance to ageing. Thus, when they are exposed to a humid atmosphere containing for example 5 to 15 $g/m^3$ of absolute humidity, degradation of their mechanical properties (STI) only occurs beyond 4% of weight increase, preferably 4.5% of weight increase, and more preferably 5% of weight increase, following the reaction of hydration of quicklime CaO to slaked lime $Ca(OH)_2$.

EXAMPLES

Example 1—Briquettes of Quicklime and Iron Oxide

Quicklime fines from grinding were prepared from a soft-burned lump lime produced in a parallel-flow regenerative kiln. Grinding is performed in a hammer mill equipped with a 2-mm screen and a recycling loop for sizes above 2 mm. These quicklime fines from grinding contain 71% of particles above 90 µm, 37% of particles above 500 µm, 21% of particles above 1 mm and 1% of particles between 2 and 3 mm. The value of to of the water reactivity test is 0.9 min. The BET specific surface area (measured by nitrogen adsorption manometry after vacuum degassing at 190° C. for at least two hours and calculated by the multipoint BET method as described in standard ISO 9277:2010E) is 1.7 m$^2$/g. These quicklime fines from grinding contain 95.7% of CaO and 0.8% of MgO by weight.

The iron oxide fines are obtained from grinding an iron ore of the magnetite type, $Fe_3O_4$, passing through a 125-μm sieve and characterized in Coulter laser granulometry by a die of 8 μm, a $d_{50}$ of 52 μm and a $d_{90}$ of 126 μm. These iron oxide fines contain 66.4% of Fe.

A Gericke GCM450 powder mixer is used, with a capacity of 10 dm$^3$, equipped with standard paddles with radius of 7 cm, rotating at 350 revolutions per minute (i.e. 2.6 m/s). This mixer is used in continuous mode for preparing a mixture consisting of:
  89.75 wt % of said quicklime fines from grinding,
  10 wt % of said iron oxide fines,
  0.25 wt % of powdered calcium stearate.

The total flow rate of powder is 300 kg/h and the residence time is 3.5 s.

The mixture obtained is very homogeneous. This signifies that the Fe content for different 10 g samples taken from the final mixture is always plus or minus 5% of the mean value.

A tangential press is used, equipped with hoops with a diameter of 604 mm and width of 145 mm for producing briquettes with a theoretical volume of 7.2 cm$^3$ in the shape of a bar of soap (4 arrays of 67 pockets per hoop, or 268 pockets per hoop), capable of developing a linear pressure of up to 120 kN/cm.

Starting with 10 tonnes of the mixture, the tangential press is supplied and compaction is performed at a speed of 12 revolutions per minute (i.e. a linear speed of 38 cm/s) at a linear pressure of 120 kN/cm (or a calculated surface pressure of 455 MPa for an angle of 0.5 degree).

Nearly 8.5 tonnes of briquettes are obtained having an average volume of 8.4 cm$^3$, an average weight of 21.4 g and an average density of 2.4. These briquettes have a length of about 36 mm, a width of about 26 mm and a thickness of about 15.8 mm. These briquettes develop a BET specific surface area of 1.6 m$^2$/g and have a total mercury pore volume (determined by mercury intrusion porosimetry according to part 1 of standard ISO 15901.1:2005E, which consists of dividing the difference between the skeletal density, measured at 30000 psia, and the apparent density, measured at 0.51 psia, by the skeletal density) by 26%.

The water reactivity of the briquettes is determined by adding 166.7 g of these briquettes, previously ground to fines with a size between 0 and 1 mm, to 600 mL of water at 20° C. The 166.7 g of briquettes corresponds to 150 g of quicklime. The value of $t_{50}$ is 1 min.

A shatter test is carried out with 10 kg of these briquettes, performing 4 successive drops from 2 μm. The amount of fines under 10 mm generated at the end of these 4 drops is weighed. A shatter test index of 4.6% is obtained.

The granulometric distribution of the iron-based particles in the composition in briquette form is determined by scanning electron microscopy and X-ray mapping, coupled to image analysis. The results are presented in Table 1. The volume fraction of iron oxide at the surface of the iron oxide particles is 54%. The iron oxide powder therefore contains 54% of active iron oxide.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 52% of the total iron is in the form of calcium ferrites $CaFe_2O_4$ or $Ca_2Fe_2O_5$, and 48% is still in the form of $Fe_2O_3$.

Example 2—Briquettes of Quicklime and Iron Oxide

The quicklime fines from grinding are those from example 1. The iron oxide fines are obtained from grinding an iron ore of the magnetite type, $Fe_3O_4$, passing through a 150 μm sieve and characterized in Coulter laser granulometry by a $d_{10}$ of 9 μm, a $d_{50}$ of 37 μm and a $d_{90}$ of 102 μm. These iron oxide fines contain 67.1% of Fe.

The mixture, prepared by the method in example 1, consists of:
  89.75 wt % of said quicklime fines from grinding,
  10 wt % of said iron oxide fines,
  0.25 wt % of powdered calcium stearate.

The briquettes are produced from this mixture by the method in example 1. 8.6 tonnes of briquettes are obtained having an average volume of 8.4 cm$^3$, an average weight of 20.3 g and an average density of 2.4. These briquettes have a length of about 36 mm, a width of about 26 mm and a thickness of about 15.6 mm. These briquettes develop a BET specific surface area of 1.6 m$^2$/g and have a total mercury pore volume of 26%.

The water reactivity of the briquettes is determined by adding 166.7 g of these briquettes, previously ground to fines with a size between 0 and 1 mm, to 600 mL of water at 20° C. The 166.7 g of briquettes corresponds to 150 g of quicklime. The value of $t_{60}$ is 0.9 min.

A shatter test is carried out with 10 kg of these briquettes, performing 4 successive drops from 2 m. The amount of fines under 10 mm generated at the end of these 4 drops is weighed. A shatter test index of 4.5% is obtained.

The volume fraction of iron oxide at the surface of the iron oxide particles in the composition in briquette form is 63%.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 61% of the total iron s in the form of calcium ferrites $CaFe_2O_4$ or $Ca_2Fe_2O_5$, and 39% is still in the form of $Fe_2O_3$ or $Fe_3O_4$.

Example 3—Briquettes of Quicklime and Iron Oxide

The quicklime fines from grinding are those from example 1. The iron oxide fines are obtained from grinding an iron ore of the magnetite type, $Fe_2O_3$, passing through a 150 μm sieve and characterized in Coulter laser granulometry by a $d_{10}$ of 0.5 μm, a $d_{50}$ of 12.3 μm and a $d_{90}$ of 35.7 μm. These iron oxide fines contain 64.6% of Fe.

The mixture, prepared by the method in example 1, consists of:
  89.75 wt % of said quicklime fines from grinding,
  10 wt % of said iron oxide fines,
  0.25 wt % of powdered calcium stearate.

The briquettes are produced from this mixture by the method in example 1. 8.3 tonnes of briquettes are obtained having an average volume of 8.5 cm$^3$, an average weight of 20.1 g and an average density of 2.4. These briquettes have a length of about 36 mm, a width of about 26 mm and a thickness of about 15.7 mm. These briquettes develop a BET specific surface area of 1.7 m$^2$/g and have a total mercury pore volume of 26%. The water reactivity of the briquettes is determined by adding 166.7 g of these briquettes, previously ground to fines with a size between 0 and 1 mm, to 600 mL of water at 20° C. The 166.7 g of briquettes corresponds to 150 g of quicklime. The value of t$_{60}$ is 0.9 min.

A shatter test is carried out with 10 kg of these briquettes, performing 4 successive drops from 2 m. The amount of fines under 10 mm generated at the end of these 4 drops is weighed. A shatter test index of 3.7% is obtained.

The volume fraction of iron oxide at the surface of the iron oxide particles in the composition in briquette form is 88%.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 84% of the total iron is in the form of calcium ferrites CaFe$_2$O$_4$ or Ca$_2$Fe$_2$O$_5$, and 16% is still in the form of Fe$_2$O$_3$.

Example 4—Thermally Treated Briquettes of Quicklime and Iron Oxide

Starting from 1 tonne of briquettes from example 1, arranged in boxes in such a way that the thickness of the bed of briquettes is 100 mm, a thermal treatment of 20 min at 1100° C. is carried out, with ramps of temperature rise and fall of 50° C. per minute.

Briquettes are obtained having an average volume of 8.2 cm$^3$, an average weight of 19 g and an average density of 2.4. These briquettes have a length of about 36 mm, a width of about 26 mm and a thickness of about 15.5 mm. These briquettes develop a BET specific surface area of 1.2 m$^2$/g and have a total mercury pore volume of 27%.

A shatter test is carried out with 10 kg of these briquettes, performing 4 successive drops from 2 m. The amount of fines under 10 mm generated at the end of these 4 drops is weighed. A shatter test index of 1.6% is obtained.

The granulometric distribution of the iron-based particles in the composition in briquette form is determined by scanning electron microscopy and X-ray mapping, coupled to image analysis.

The results are presented in Table 1.

The volume fraction of iron oxide at the surface of the iron oxide particles is 43%. The iron oxide powder therefore contains 43% of active iron oxide.

Starting from 30 of these thermally treated briquettes, a powder is prepared with granulometry under 80 μm. The latter is characterized by X-ray diffraction, and phase quantification is performed by Rietveld analysis. 54% of the total iron is in the form of calcium ferrites CaFe$_2$O$_4$ or Ca$_2$Fe$_2$O$_5$, and 46% is still in the form of Fe$_2$O$_3$, or Fe$_3$O$_4$.

The water reactivity of the briquettes is determined by adding 174.2 g of these briquettes, previously ground to fines with a size between 0 and 1 mm, to 600 mL of water at 20° C. The 174.2 g of briquettes corresponds to 150 g of free quicklime (i.e. not in the form of calcium ferrites). The value of t$_{60}$ is 4.7 min.

Example 5—Thermally Treated Briquettes of Quicklime and Iron Oxide

Starting from 1 tonne of briquettes from example 3, arranged in boxes in such a way that the thickness of the bed of briquettes is 100 mm, a thermal treatment of 20 min at 1100° C. is carried out, with ramps of temperature rise and fall of 50° C. per minute.

Briquettes are obtained having an average volume of 8.5 cm$^3$, an average weight of 20.0 g and an average density of 2.4. These briquettes have a length of about 36 mm, a width of about 26 mm and a thickness of about 15.7 mm. These briquettes develop a BET specific surface area of 0.9 m$^2$/g and have a total mercury pore volume of 27%.

A shatter test is carried out with 10 kg of these briquettes, performing 4 successive drops from 2 m. The amount of fines under 10 mm generated at the end of these 4 drops is weighed. A shatter test index of 1.4% is obtained.

The volume fraction of iron oxide at the surface of the iron oxide particles is 84%. The iron oxide powder therefore contains 84% of active iron oxide.

Starting from 30 of these thermally treated briquettes, a powder is prepared with granulometry under 80 μm. The latter is characterized by X-ray diffraction, and phase quantification is performed by Rietveld analysis. 91% of the total iron is in the form of calcium ferrites CaFe$_7$O$_4$ or Ca$_2$Fe$_2$O$_5$, and 9% is still in the form of Fe$_2$O$_3$.

The water reactivity of the briquettes is determined by adding 179.4 g of these briquettes, previously ground to fines with a size between 0 and 1 mm, to 600 mL of water at 20° C. The 179.4 g of briquettes corresponds to 150 g of free quicklime (i.e. not in the form of calcium ferrites). The value of t$_{60}$ is 3.8 min.

Example 6—Briquettes of Quicklime and Iron Oxide

The quicklime fines from grinding are those from example 1. The screened quicklime fines were recovered after the ungraded material at the outlet of a rotary kiln equipped with a preheater was screened through a 3 mm screen. These screened quicklime fines contain 74% of particles above 90 μm, 60% of particles above 500 μm, 47% of particles above 1 mm and 18% of particles between 2 and 3 mm. The value of to in the water reactivity test is 4 min. The BET specific surface area is 1.2 m$^2$/g. These screened quicklime fines contain 97.1% of CaO and 0.7% of MgO by weight. The iron oxide fines are those from example 3.

The mixture, prepared by the method in example 1, consists of:
  44.75 wt % of said quicklime fines from grinding,
  5-45 wt % of said screened quicklime fines,
  10 wt % of said iron oxide fines,
  0.25 wt % of powdered calcium stearate.

The briquettes are produced from this mixture by the method in example 1. 8.6 tonnes of briquettes are obtained having an average volume of 8.6 cm$^3$, an average weight of 20.3 g and an average density of 2.4. These briquettes have a length of about 36 mm, a width of about 26 mm and a thickness of about 15.7 mm. These briquettes develop a BET specific surface area of 1.4 m$^2$/g and have a total mercury pore volume of 26%. The water reactivity of the briquettes is determined by adding 166.7 g of these briquettes, previously ground to fines with a size between 0 and 1 mm, to 600 mL of water at 20° C. The 166.7 g of briquettes corresponds to 150 g of quicklime. The value of too is 1.6 min.

A shatter test is carried out with 10 kg of these briquettes, performing 4 successive drops from 2 m. The amount of fines under 10 mm generated at the end of these 4 drops is weighed. A shatter test index of 4.4% is obtained.

The volume fraction of iron oxide at the surface of the iron oxide particles in the composition in briquette form is 86%.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 83% of the total iron is in the form of calcium ferrites $CaFe_2O_4$ or $Ca_2Fe_2O_5$, and 17% is still in the form of $Fe_2O_3$.

Example 7—Briquettes of Quicklime and Iron Oxide

The screened quicklime fines are those from example 6. The iron oxide fines are those from example 3.

The mixture, prepared by the method in example 1, consists of:
  89.75 wt % of said screened quicklime fines,
  10 wt % of said iron oxide fines,
  0.25 wt % of powdered calcium stearate.

The briquettes are produced from this mixture by the method in example 1. 8.1 tonnes of briquettes are obtained having an average volume of 8.5 cm³, an average weight of 20.0 g and an average density of 2.4. These briquettes have a length of about 36 mm, a width of about 26 mm and a thickness of about 15.6 mm. These briquettes develop a BET specific surface area of 1.3 m²/g and have a total mercury pore volume of 26%. The water reactivity of the briquettes is determined by adding 166.7 g of these briquettes, previously ground to fines with a size between 0 and 1 mm, to 600 mL of water at 20° C. The 166.7 g of briquettes corresponds to 150 g of quicklime. The value of $t_{60}$ is 3.7 min.

A shatter test is carried out with 10 kg of these briquettes, performing 4 successive drops from 2 m. The amount of fines under 10 mm generated at the end of these 4 drops is weighed. A shatter test index of 11.6% is obtained.

The volume fraction of iron oxide at the surface of the iron oxide particles in the composition in briquette form is 87%.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 81% of the total iron is in the form of calcium ferrites $CaFe_2O_4$ or $Ca_2Fe_2O_5$, and 19% s still in the form of $Fe_2O_3$.

Example 8—Briquettes of Dolomitic Quicklime and Iron Oxide

The quicklime fines from grinding are those from example 1. The fines of burned dolomite from grinding were prepared starting from a burned lump dolomite produced in a parallel-flow regenerative kiln. Grinding was carried out in a hammer mill. These fines of burned dolomite from grinding contain 91% of particles above 90 μm, 44% of particles above 500 μm, 31% of particles above 1 mm and 17% of particles above 2 mm and 8% of particles between 3 and 5 mm. The value of too of the water reactivity test is 3.1 min. The BET specific surface area is 2.8 m²/g. These fines of burned dolomite from grinding contain 58.5% of CaO and 38.4% of MgO by weight. The iron oxide fines are those from example 3.

The mixture, prepared by the method in example 1, consists of:
  64.75 wt % of said quicklime fines from grinding,
  25 wt % of said fines of burned dolomite from grinding,
  10 wt % of said iron oxide fines,
  0.25 wt % of powdered calcium stearate.

The briquettes are produced from this mixture by the method in example 1. 8.3 tonnes of briquettes are obtained having an average volume of 8.4 cm³, an average weight of 19.9 g and an average density of 2.4. These briquettes have a length of about 36 mm, a width of about 26 mm and a thickness of about 15.5 mm. These briquettes develop a BET specific surface area of 2.1 m²/g and have a total mercury pore volume of 25%.

A shatter test is carried out with 10 kg of these briquettes, performing 4 successive drops from 2 m. The amount of fines under 10 mm generated at the end of these 4 drops is weighed. A shatter test index of 5.3% is obtained.

The volume fraction of iron oxide at the surface of the iron oxide particles in the composition in briquette form is 86%.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 84% of the total iron is in the form of calcium ferrites $CaFe_2O_4$ or $Ca_2Fe_2O_5$, and 16% is still in the form of $Fe_2O_3$.

Comparative Example 1—Briquettes of Quicklime and Iron Oxide of Low Activity The quicklime fines from grinding are those from example 1. The iron oxide fines are obtained from grinding an iron ore of the magnetite type, $Fe_3O_4$, passing through a 250 μm sieve but not passing through a 125 μm sieve, characterized in Coulter laser granulometry by a $d_{10}$ of 140 μm, a $d_{50}$ of 227 μm and a $d_{90}$ of 318 μm. These iron oxide fines contain about 67% of Fe.

The mixture, prepared by the method in example 1, consists of:
  89.75 wt % of said quicklime fines from grinding,
  10 wt % of said iron oxide fines,
  0.25 wt % of powdered calcium stearate.

The briquettes are produced from this mixture by the method in example 1. 8.2 tonnes of briquettes are obtained having an average volume of 8.5 cm³, an average weight of 20.5 g and an average density of 2.4. These briquettes have a length of about 36 mm, a width of about 26 mm and a thickness of about 15.8 mm. These briquettes develop a BET specific surface area of 1.6 m²/g and have a total mercury pore volume of 26%.

The water reactivity of the briquettes is determined by adding 166.7 g of these briquettes, previously ground to fines with a size between 0 and 1 mm, to 600 mL of water at 20° C. The 166.7 g of briquettes corresponds to 150 g of quicklime. The value of too is 1.0 min.

A shatter test is carried out with 10 kg of these briquettes, performing 4 successive drops from 2 m. The amount of fines under 10 mm generated at the end of these 4 drops is weighed. A shatter test index of 4.9% is obtained.

The granulometric distribution of the iron-based particles in the composition in briquette form is determined by scanning electron microscopy and X-ray mapping, coupled to image analysis. The results are presented in Table 1. The volume fraction of iron oxide at the surface of the iron oxide particles in the composition in briquette form is 24%.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 16% of the total iron is in the form of calcium ferrites $CaFe_2O_4$ or $Ca_2Fe_2O_5$, and 84% is still in the form of $Fe_2O_3$ or $Fe_3O_4$.

Comparative Example 2—Briquettes of Quicklime and Iron Oxide of Low Activity

The quicklime fines from grinding are those from example 1. The iron oxide fines are obtained from grinding an iron ore of the magnetite type, $Fe_3O_4$, passing through a 500 μm sieve but not passing through a 250 μm sieve, characterized in Coulter laser granulometry by a $d_{10}$ of 282 μm, a $d_{50}$ of 417 μm and a $d_{90}$ of 663 μm. These iron oxide fines contain about 67% of Fe.

The mixture, prepared by the method in example 1, consists of:
- 89.75 wt % of said quicklime fines from grinding,
- 10 wt % of said iron oxide fines,
- 0.25 wt % of powdered calcium stearate.

The briquettes are produced from this mixture by the method in example 1. 8.5 tonnes of briquettes are obtained having an average volume of 8.4 cm$^a$, an average weight of 20.3 g and an average density of 2.4. These briquettes have a length of about 36 mm, a width of about 26 mm and a thickness of about 15.7 mm. These briquettes develop a SET specific surface area of 1.6 m$^2$/g and have a total mercury pore volume of 26%.

The water reactivity of the briquettes is determined by adding 166.7 g of these briquettes, previously ground to fines with a size between 0 and 1 mm, to 600 mL of water at 20° C. The 166.7 g of briquettes corresponds to 150 g of quicklime. The value of $t_{60}$ is 0.9 min.

A shatter test is carried out with 10 kg of these briquettes, performing 4 successive drops from 2 m. The amount of fines under 10 mm generated at the end of these 4 drops is weighed. A shatter test index of 4.8% is obtained.

The granulometric distribution of the iron-based particles in the composition in briquette form is determined by scanning electron microscopy and X-ray mapping, coupled to image analysis. The results are presented in Table 1. The volume fraction of iron oxide at the surface of the iron oxide particles in the composition in briquette form is 10%.

The briquettes are also characterized by carrying out a thermal treatment of 10 min at 1100° C. (hot charge/discharge) on 3 of these briquettes, at the end of which a powder with granulometry under 80 μm is prepared. The latter is characterized by X-ray diffraction, and phase quantification is performed by Rietveld analysis. 11% of the total iron is in the form of calcium ferrites $CaFe_2O_4$ or $Ca_2Fe_2O_5$, and 89% is still in the form of $Fe_2O_3$ or $Fe_3O_4$.

Comparative Example 3—Thermally Treated Briquettes of Quicklime and Iron Oxide of Low Activity Starting from 1 tonne of briquettes from comparative example 2, arranged in boxes in such a way that the thickness of the bed of briquettes is 100 mm, thermal treatment is carried out for 2 hours at 1200° C., with ramps of temperature rise and fall of 50° C. per minute.

Briquettes are obtained having an average volume of 7.2 cm$^3$, an average weight of 20.1 g and an average density of 2.4. These briquettes have a thickness of about 15.4 mm. These briquettes develop a SET specific surface area of 0.4 m$^2$/g and have a total mercury pore volume of 23%.

A shatter test is carried out with 10 kg of these briquettes, performing 4 successive drops from 2 m. The amount of fines under 10 mm generated at the end of these 4 drops is weighed. A shatter test index of 1.5% is obtained.

The volume fraction of iron oxide at the surface of the iron oxide particles is 9%. The iron oxide powder therefore contains 9% of active iron oxide.

Starting from 30 of these thermally treated briquettes, a powder is prepared with granulometry under 80 μm. The latter is characterized by X-ray diffraction, and phase quantification is performed by Rietveld analysis. 16% of the total iron is in the form of calcium ferrites $CaFe_2O_4$ or $CaFe_2O_5$, and 84% is still in the form of $Fe_2O_3$, or $Fe_3O_4$.

The water reactivity of the briquettes is determined by adding 169.0 g of these briquettes, previously ground to fines with a size between 0 and 1 mm, to 600 mL of water at 20° C. The 169.0 g of briquettes corresponds to 150 g of free quicklime (i.e. not in the form of calcium ferrites). The value of to is 13 min.

TABLE 1

Granulometric distribution (expressed in percentage surface area of a section of the briquettes) determined by scanning electron microscopy and X-ray mapping, coupled to image analysis, of the iron-based particles in the briquettes

|  | Ex 1 | Ex 4 | CE 1 | CE 2 |
|---|---|---|---|---|
| >2 mm | 0.0 | 0.0 | 0.0 | 0.0 |
| <1-2 mm> | 0.0 | 0.0 | 0.0 | 0.0 |
| <0.5-1 mm> | 0.0 | 0.0 | 0.0 | 0.0 |
| <315-500 μm> | 0.0 | 0.0 | 0.0 | 0.0 |
| <250-315 μm> | 0.0 | 0.0 | 0.0 | 15.6 |
| <200-250 μm> | 0.0 | 0.0 | 0.0 | 7.9 |
| <160-200 μm> | 0.0 | 0.0 | 0.0 | 48.4 |
| <125-160 μm> | 0.0 | 0.0 | 0.0 | 20.0 |
| <90-125 μm> | 0.0 | 0.0 | 0.0 | 7.7 |
| <80-90 μm> | 0.0 | 0.0 | 40.4 | 0.0 |
| <63-80 μm> | 0.0 | 0.0 | 36.0 | 0.0 |
| <50-63 μm> | 0.0 | 0.0 | 11.9 | 0.2 |
| <45-50 μm> | 0.0 | 13.4 | 0.0 | 0.0 |
| <40-45 μm> | 0.0 | 0.0 | 10.1 | 0.1 |
| <32-40 μm> | 44.6 | 23.4 | 0.0 | 0.0 |
| <20-32 μm> | 37.8 | 37.4 | 1.2 | 0.0 |
| <10-20 μm> | 12.9 | 21.1 | 0.4 | 0.0 |
| <5-10 μm> | 3.8 | 3.7 | 0.0 | 0.0 |
| <2-5 μm> | 0.7 | 0.9 | 0.0 | 0.0 |
| <1-2 μm> | 0.0 | 0.0 | 0.0 | 0.0 |
| <1 μm | 0.0 | 0.0 | 0.0 | 0.0 |

Examples 9 to 16

Green briquettes are prepared according to the invention with ground quicklime containing particles with sizes between 0 and 2 mm, but having different granulometric profiles and contents of iron oxide expressed in $Fe_1O_3$ equivalent ranging from 10% to 60%. The iron oxide used in these examples is characterized by a $d_{10}$ of 0.5 μm, $d_{50}$ of 12.3 μm and $d_{90}$ of 35.7 μm. In each example, the particles of ground quicklime with size between 0 and 2 mm have at least 30% of particles that are under 90 μm.

Green briquettes of identical composition were treated thermally at 1100° C. or at 1200° C. for 20 minutes to obtain thermally treated briquettes having different contents of quicklime and iron-based compounds. The composition of the briquettes and the thermal treatments carried out are presented in Table 2. Several tests were carried out on these green and thermally treated briquettes, and are described below with the aid of FIGS. 1 to 4.

Figure 2:
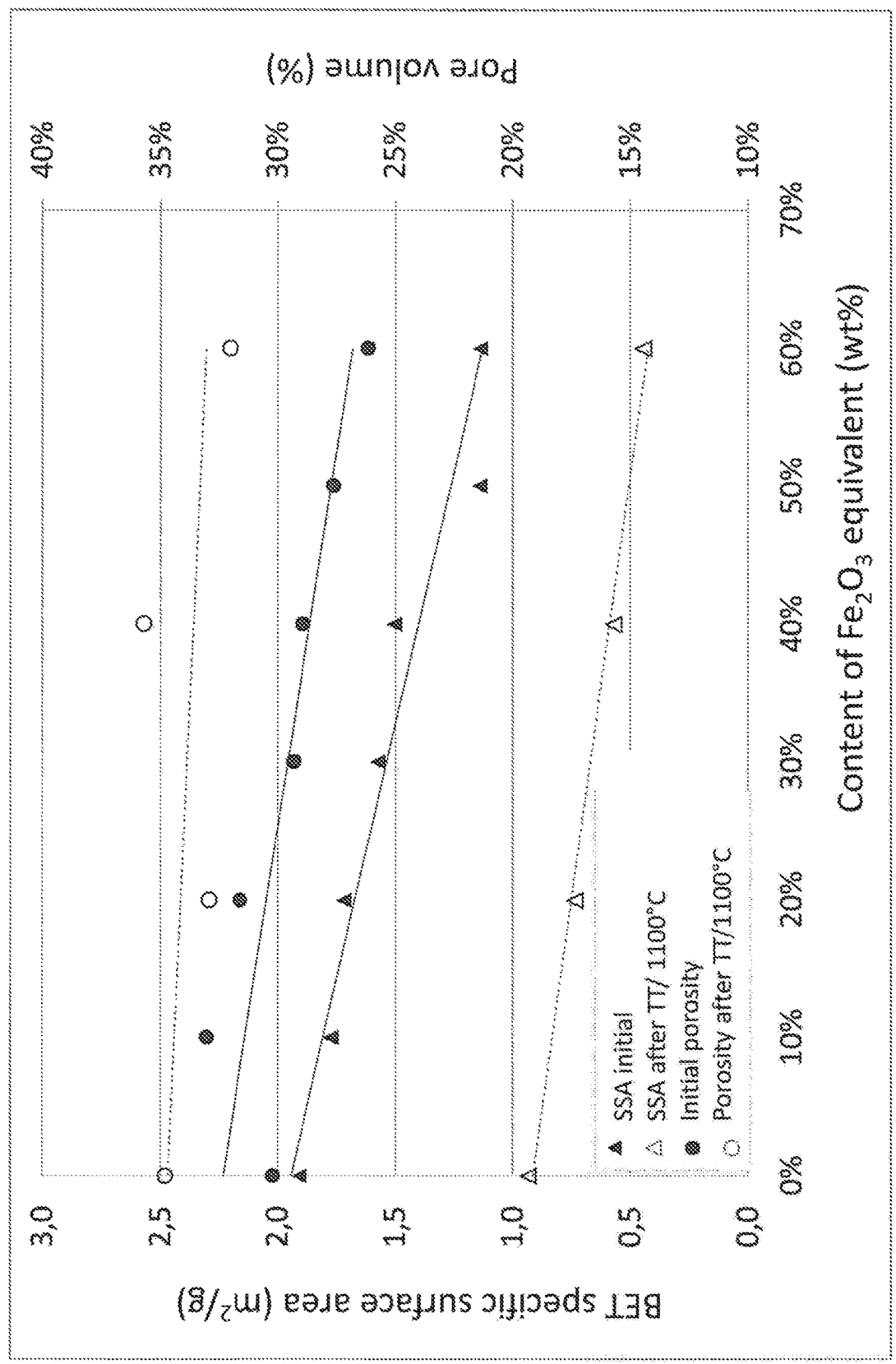
FIG. 2 is a graph of the BET specific surface area and of the BJH pore volume as a function of the content of $Fe_2O_3$ equivalent in the briquettes according to the present invention.

FIG. 2 is a graph showing:
- the variation of the BET specific surface area as a function of the content of iron-based compound expressed in $Fe_2O_3$ equivalent, for green briquettes;
- the variation of the porosity as a function of the content of iron-based compound expressed in $Fe_2O_3$ equivalent, for green briquettes;
- the variation of the BET specific surface area as a function of the content of iron-based compound expressed in $Fe_2O_3$ equivalent, for thermally treated briquettes that have undergone thermal treatment of 1100° C. for 20 minutes; and
- the variation of the porosity as a function of the content of iron-based compound expressed in $Fe_2O_5$ equivalent, for thermally treated briquettes that have undergone thermal treatment of 1100° C. for 20 minutes.

As can be seen, these variations of porosity and specific surface area show a slight linear decrease with the content of iron-based compound for the green and thermally treated briquettes. The thermally treated briquettes have a lower specific surface area than the green briquettes, whereas they have higher porosity for identical contents of iron-based compound.

expressed in $Fe_2O_5$ equivalent below 40%, whereas for the thermally treated briquettes, all the shatter tests are below 10%, or even 6%.

Figure 4:
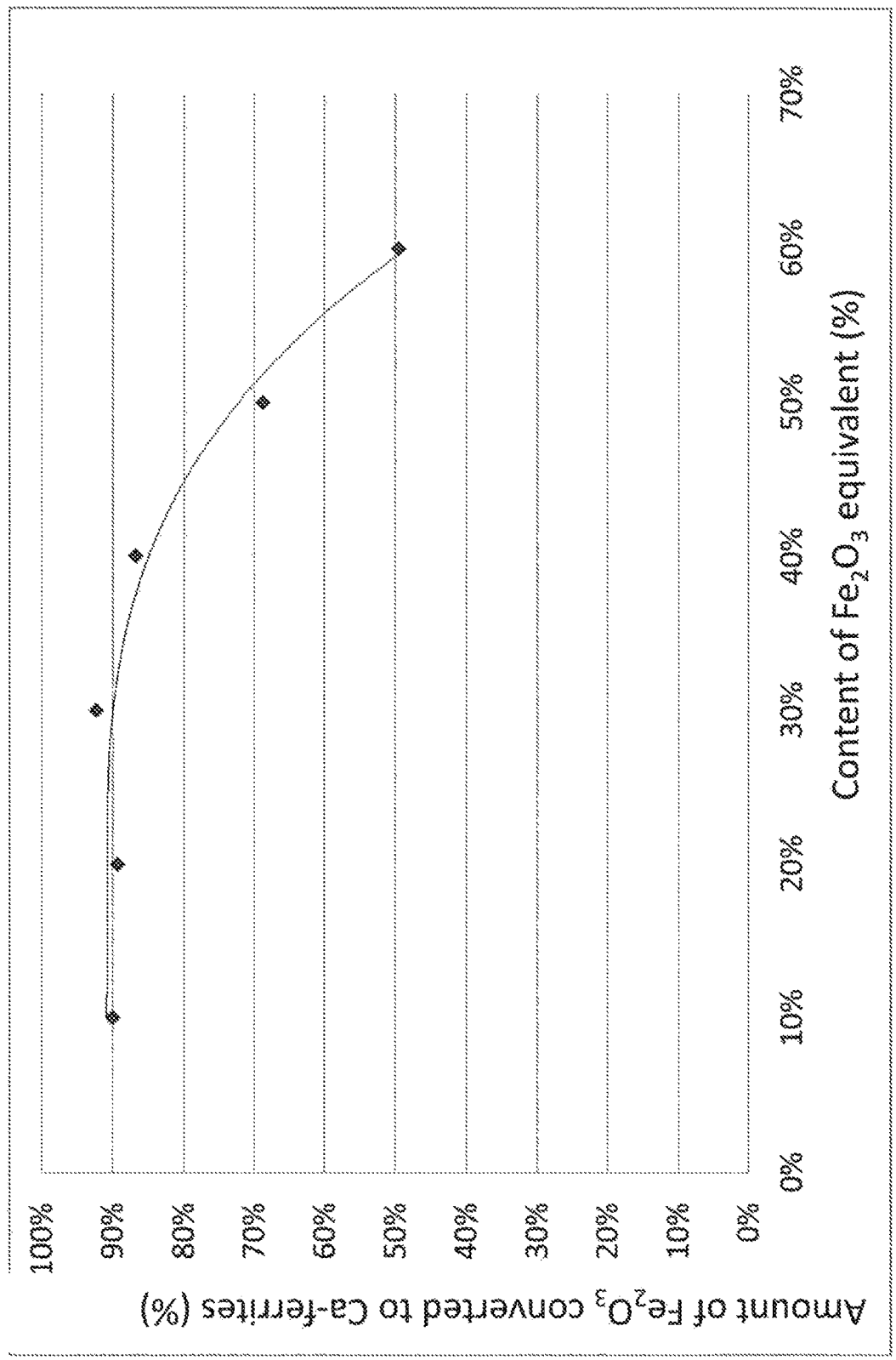
FIG. 4 is a graph of the percentage of $Fe_2O_3$ converted to calcium ferrites as a function of the content of $Fe_2O_3$ equivalent in the thermally treated briquettes according to the present invention.

FIG. 4 is a graph showing the variation of the yield of iron-based compound (iron oxide) converted to calcium ferrite, as a function of the iron oxide content expressed in $Fe_2O_3$ equivalent.

As can be seen, the yield in conversion to calcium ferrite begins to decrease for contents of iron oxide expressed in $Fe_2O_3$ equivalent above 40%.

Figure 5:
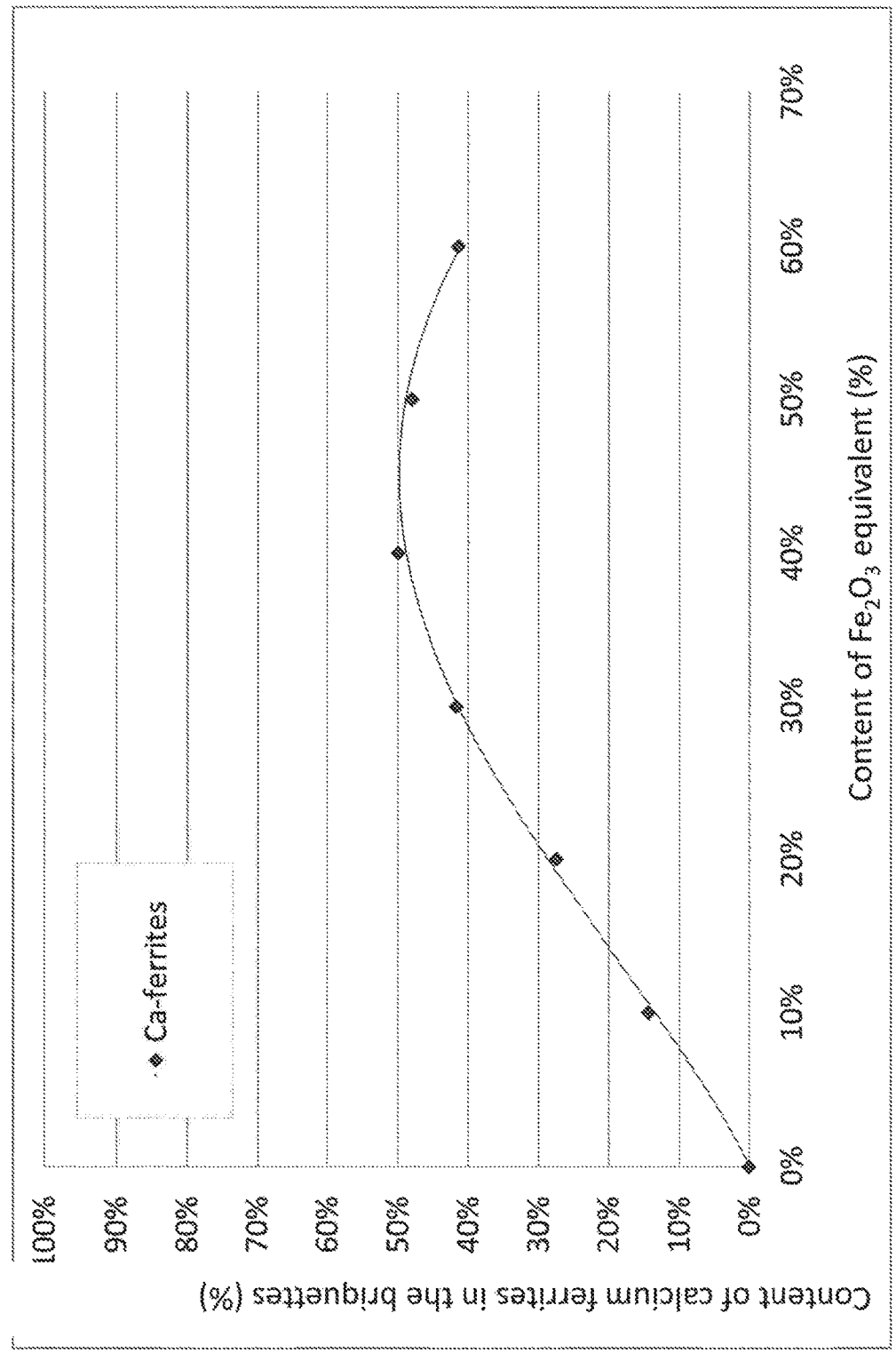
FIG. 5 is a graph of the variation of the content of calcium ferrites expressed as $Fe_2O_3$ equivalent in the thermally treated briquettes as a function of the iron oxide content expressed in $Fe_2O_3$ equivalent in the green briquettes before thermal treatment.

FIG. 5 shows the variation of the content of calcium ferrites expressed in $Fe_2O_3$ equivalent in the thermally treated briquettes as a function of the iron oxide content expressed in $Fe_2O_3$ equivalent in the green briquettes before thermal treatment.

As can be seen, the contents of calcium ferrites in the thermally treated briquettes increase with the iron oxide content in the green briquettes. However, this variation passes through a maximum at 50% content of calcium ferrites for contents of iron oxide in the green briquettes in the range from 40 to 45%, and then decreases to contents of calcium ferrites of about 40% for contents of iron oxide in the green briquettes of 60%.

Nevertheless, it is possible to push the yield in conversion of iron oxide to calcium ferrites beyond 90% and obtain contents of calcium ferrites in the thermally treated briquettes beyond 50%, even beyond 70% for example by increasing the temperature of the thermal treatment to 1200° C. or by optimizing grinding of the quicklime so as to increase the proportion of quicklime particles smaller than 90 µm, or a combination of the two. Several examples were undertaken and the measurement results are presented in Table 2.

TABLE 2

| Examples | % $Fe_2O_3$ equivalent | Thermal treatment temperature | Type of CaO | % conversion to calcium ferrites | % of calcium ferrites in the thermally treated briquette |
|---|---|---|---|---|---|
| Ex. 9 | 20% | 1200° C. | CaO < 2 mm, with 30% < 90 µm | 95% | 31% |
| Ex. 10 | 30% | 1200° C. | CaO < 2 mm, with 30% < 90 µm | 98% | 47% |
| Ex. 11 | 40% | 1200° C. | CaO < 2 mm, with 30% < 90 µm | 98% | 58% |
| Ex. 12 | 50% | 1200° C. | CaO < 2 mm, with 30% < 90 µm | 97% | 74% |
| Ex. 13 | 50% | 1100° C. | 50% of (CaO < 2 mm, with 30% < 90 µm) + 50% of CaO < 90 µm | 90% | 65% |
| Ex. 14 | 50% | 1100° C. | 100% of (CaO < 90 µm) | 96% | 73% |
| Ex. 15 | 50% | 1200° C. | 50% of (CaO < 2 mm, with 30% < 90 µm) + 50% of CaO < 90 µm | 99% | 76% |
| Ex. 16 | 50% | 1100° C. | CaO < 2 mm, with 30% < 90 µm | 61% | 43% |

Figure 3:
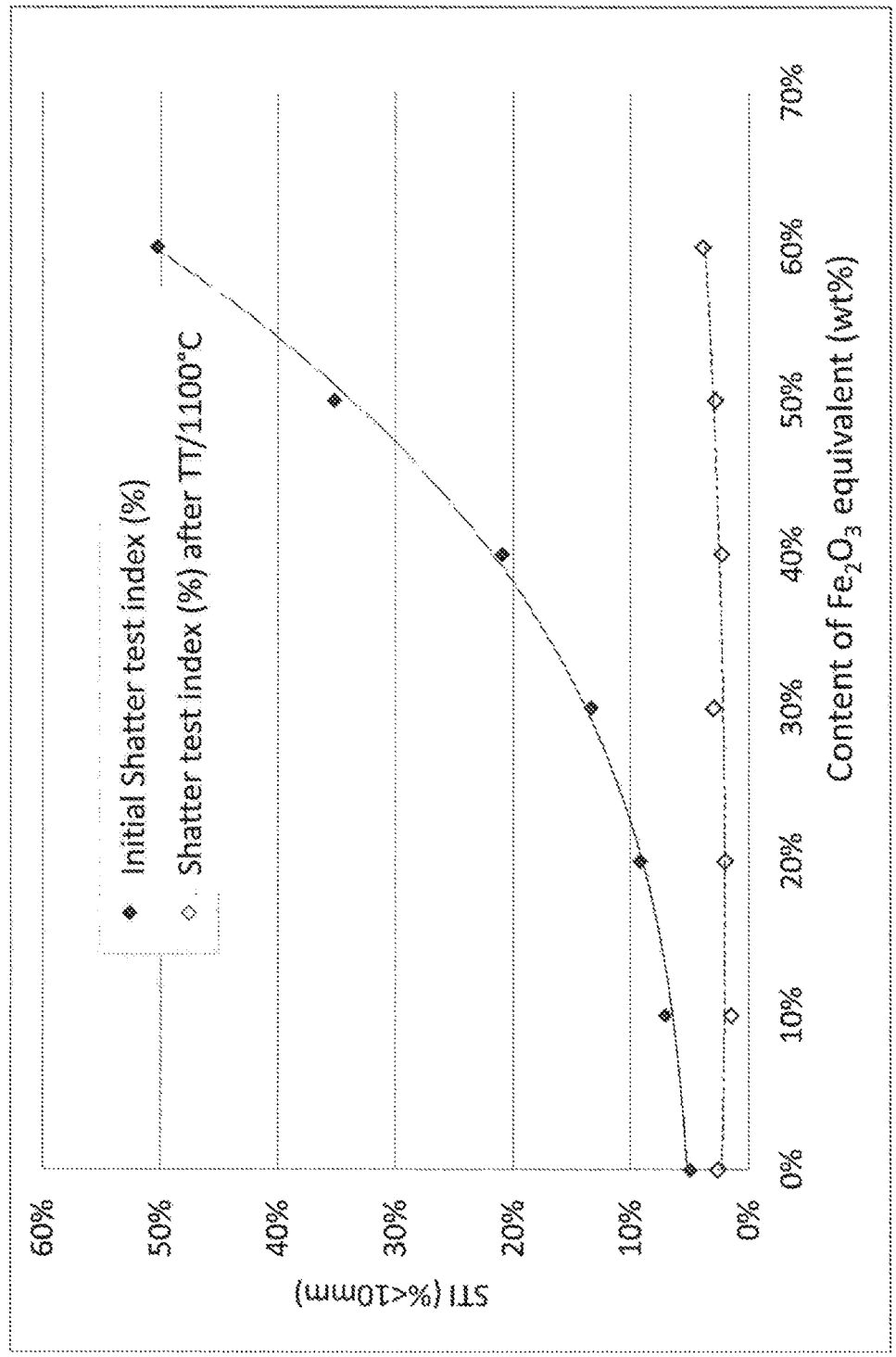
FIG. 3 is a graph of the shatter test index (STI) as a function of the content of $Fe_2O_3$ equivalent in the thermally treated and green briquettes according to the present invention.

FIG. 3 is a graph showing:
- the variation of the shatter test index for green briquettes, as a function of the contents of iron-based compound expressed in $Fe_2O_3$ equivalent; and
- the variation of the shatter test index for thermally treated briquettes that have undergone thermal treatment at a temperature of 1100° C. for 20 minutes, as a function of the contents of iron-based compound expressed in $Fe_2O_3$ equivalent.

As can be seen, the shatter indices are below 20% for green briquettes having contents of iron-based compound Comparative Example 4

The shatter indices were compared with the compressive force on several samples of green briquettes to establish the correlation between the shatter test index and the compressive force. The green briquettes tested comprised quicklime whose particle size was between 0 and 3 mm with different contents of iron oxide, from 0 to 60 wt % and different contents of lubricant, ranging from 0.125 to 0.5 wt %, relative to the total weight of the briquettes. The parameters of the briquetting process were also modified to ensure that the population for establishing the correlation was large enough.

As can be seen in FIG. 1, a compressive force above 144 kg, corresponding to 317.5 pounds, is required for briquettes having a shatter test index below 10%.

Of course, the present invention is not in any way limited to the embodiments described above and many modifications may be made while remaining within the scope of the appended claims.

The invention claimed is:

1. Method for manufacturing a calcium-magnesium composition in the form of briquettes, comprising the following steps:
   i. supplying a homogeneous pulverulent mixture comprising at least one quick calcium-magnesium compound, said mixture comprising at least 40 wt % of CaO+MgO equivalent relative to the weight of said composition and having a Ca/Mg molar ratio greater than or equal to 1;
   ii. feeding a roller press with said homogeneous pulverulent mixture, said roller press being equipped with rollers provided with pockets,
   iii. compressing said homogeneous pulverulent mixture in said roller press while obtaining a calcium-magnesium composition in the form of green briquettes, and
   iv. collecting said green briquettes
   said method being characterized in that said homogeneous pulverulent mixture further comprises an iron-based compound present at a content of at least 20 wt % of $Fe_2O_3$ equivalent relative to the weight of said composition, said iron-based compound having a granulometric distribution characterized by a median size $d_{50}$ below 100 μm as well as a size $d_{90}$ below 200 μm, in that said quick calcium-magnesium compound is quicklime, said quicklime having a value of $t_{60}$ below 10 min, in that the rollers of the roller press develop linear speeds at the periphery of the rollers between 10 and 100 cm/s and linear pressures between 60 and 160 kN/cm, and in that the method further comprises a thermal treatment of said collected green briquettes at a temperature between 900° C. and 1200° C. for a predetermined duration of between 3 and 20 minutes, while obtaining fired briquettes containing calcium ferrite and having simultaneously a Shatter Test Index less than 8%, and a porosity value greater than or equal to 30%.

2. Method according to claim 1, in which said compression step is effected in the presence of a binder or a lubricant at a content between 0.1 and 1 wt % relative to the total weight of said green briquettes.

3. Method according to claim 1, further comprising, before said supplying of a homogeneous pulverulent mixture,
   v. feeding a mixer with at least 40 wt % of quicklime having a value of $t_{60}$ below 10 min relative to the weight of said composition and with at least 20 wt % of $Fe_2O_3$ equivalent of an iron-based compound relative to the weight of said composition, said iron-based compound having a granulometric distribution characterized by a median size $d_{50}$ below 100 μm as well as a size $d_{90}$ below 200 μm; and
   vi. mixing said quicklime with said iron-based compound for a predetermined length of time, sufficient to obtain an approximately homogeneous pulverulent mixture of said quicklime and of said iron-based compound.

4. Method according to claim 3, in which a binder or lubricant is added to the mixer, and in which said binder or lubricant is included in said homogeneous pulverulent mixture.

5. Method according to claim 1, in which said quick calcium-magnesium compound contains at least 10 wt % of quicklime in the form of ground particles.

6. Method according to claim 1, further comprising a pre-treatment step of the collected green briquettes under modified atmosphere containing at least 2 vol % $CO_2$ and at most 30 vol % $CO_2$ with respect to the modified atmosphere.

7. Method for manufacturing a calcium-magnesium composition in the form of fired briquettes, comprising the following steps:
   i. supplying a homogeneous pulverulent mixture comprising at least one quick calcium-magnesium compound, said mixture comprising at least 40 wt % of CaO+MgO equivalent relative to the weight of said composition and having a Ca/Mg molar ratio greater than or equal to 1,
   ii. feeding a roller press with said homogeneous pulverulent mixture, said roller press being equipped with rollers provided with pockets,
   iii. compressing said homogeneous pulverulent mixture in said roller press, while obtaining a calcium-magnesium composition in the form of green briquettes, and
   iv. collecting said green briquettes,
   said method being characterized in that said homogeneous pulverulent mixture further comprises an iron-based compound present at a content of at least 20 wt % of $Fe_2O_3$ equivalent relative to the weight of said composition, said iron-based compound having a granulometric distribution characterized by a median size $d_{50}$ below 100 μm as well as a size $d_{90}$ below 200 μm, in that said "quick" calcium-magnesium compound is burned dolomite, said burned dolomite having a value of $t_{70}$ below 10 min, in that the rollers of the roller press develop linear speeds at the periphery of the rollers between 10 and 100 cm/s and linear pressures between 60 and 160 kN/cm, and in that the method further comprises a thermal treatment of said collected green briquettes at a temperature between 900° C. and 1200° C. for a predetermined duration of between 3 and 20 minutes, while obtaining fired briquettes containing calcium ferrite and having simultaneously a Shatter Test Index less than 8%, and a porosity value greater than or equal to 30%.

8. Method according to claim 7, in which said compression step is effected in the presence of a binder or a lubricant at a content between 0.1 and 1 wt % relative to the total weight of said green briquettes.

9. Method according to claim 7, further comprising, before said supplying of a homogeneous pulverulent mixture,
   i. feeding a mixer with at least 40 wt % of burned dolomite having a value of $t_{70}$ below 10 min relative to the weight of said composition and with at least 20 wt % of $Fe_2O_3$ equivalent of an iron-based compound relative to the weight of said composition, said iron-based compound having a granulometric distribution characterized by a median size $d_{50}$ below 100 μm as well as a size $d_{90}$ below 200 μm, and
   ii. mixing said burned dolomite with said iron-based compound for a predetermined length of time, sufficient to obtain an approximately homogeneous pulverulent mixture of said burned dolomite and of said iron-based compound.

10. Method according to claim 9, in which a binder or lubricant is added to the mixer, and in which said binder or lubricant is included in said homogeneous pulverulent mixture.

11. Method according to claim 7, further comprising a pre-treatment step of the collected green briquettes under modified atmosphere containing at least 2 vol % $CO_2$ and at most 30 vol % $CO_2$ with respect to the modified atmosphere.

\* \* \* \* \*